US011283749B2

(12) United States Patent
He et al.

(10) Patent No.: US 11,283,749 B2
(45) Date of Patent: Mar. 22, 2022

(54) METHOD AND SYSTEM FOR CONTROLLING MESSAGE TRANSMISSION FOR A COMMUNICATION GROUP

(71) Applicant: Tencent Technology (Shenzhen) Company Limited, Shenzhen (CN)

(72) Inventors: Weiquan He, Shenzhen (CN); Zhifang Xi, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 63 days.

(21) Appl. No.: 16/588,488

(22) Filed: Sep. 30, 2019

(65) Prior Publication Data
US 2020/0028815 A1 Jan. 23, 2020

Related U.S. Application Data

(63) Continuation of application No. PCT/CN2017/095877, filed on Aug. 3, 2017.

(51) Int. Cl.
*H04L 12/58* (2006.01)
*H04L 51/224* (2022.01)
(Continued)

(52) U.S. Cl.
CPC .......... *H04L 51/24* (2013.01); *H04L 12/1813* (2013.01); *H04L 12/1859* (2013.01); *H04L 51/043* (2013.01); *H04L 51/32* (2013.01)

(58) Field of Classification Search
CPC . H04L 51/24; H04L 12/1813; H04L 12/1859; H04L 51/043; H04L 51/32
(Continued)

(56) References Cited

U.S. PATENT DOCUMENTS 8,528,050 B2 9/2013 Kashima et al.
2006/0026254 A1* 2/2006 Kessen ................... H04L 51/04
709/207
(Continued)

FOREIGN PATENT DOCUMENTS

CN 101155052 A 4/2008
CN 104394269 A 3/2015
(Continued)

OTHER PUBLICATIONS

Tencent Technology, IPRP, PCT/CN2017/095877, dated Feb. 4, 2020, 5 pgs.
(Continued)

*Primary Examiner* — Kevin S Mai
(74) *Attorney, Agent, or Firm* — Morgan, Lewis & Bockius LLP

(57) ABSTRACT

A method and system for controlling message transmission for a communication group are disclosed. While a message-on-hold mode remains activated for a first communication group at a first client device: the device, in response to detecting a change in the usage of the first client device: in accordance with a determination that communication suspension criteria are met with respect to the first communication group, prevents transmission of communications in the first communication group to the first client device; and in accordance with a determination that communication resumption criteria are met with respect to the first communication group, temporarily enables transmission of communications in the first communication group to the first client device without deactivating the message-on-hold mode for the first communication group.

20 Claims, 17 Drawing Sheets

(51) Int. Cl.
  *H04L 12/18* (2006.01)
  *H04L 51/043* (2022.01)
  *H04L 51/52* (2022.01)

(58) Field of Classification Search
  USPC .......................................................... 709/206
  See application file for complete search history.

(56) References Cited

U.S. PATENT DOCUMENTS

| | | |
|---|---|---|
| 2008/0165698 A1 | 7/2008 | Dalsgaard et al. |
| 2009/0247196 A1 | 10/2009 | Kim et al. |
| 2015/0133098 A1* | 5/2015 | Warr ..................... H04W 4/026 |
| | | 455/418 |
| 2018/0331996 A1* | 11/2018 | Zhang ..................... H04L 51/16 |
| 2018/0367495 A1* | 12/2018 | Kim ........................ H04L 51/36 |

FOREIGN PATENT DOCUMENTS

| | | |
|---|---|---|
| CN | 105120065 A | 12/2015 |
| CN | 105812228 A | 7/2016 |
| WO | WO 2014200631 A1 | 12/2014 |

OTHER PUBLICATIONS

Tencent Technology, ISRWO, PCT/CN2017/095877, dated Apr. 26, 2018, 7 pgs.

* cited by examiner (A)

---

Monitoring the usage of the first client device by the user includes monitoring an input focus state of a first user interface object that corresponds to the first communication group at the first client device ⊢ 612

---

Monitoring the usage of the first client device by the user includes monitoring whether a level of user interaction with a first user interface object that corresponds to the first communication group at the first client device exceeds a level of user interaction with respective user interface objects that correspond to other communication groups that involve the first user account ⊢ 614

---

The first interaction criteria require that the first change in the usage of the first client device includes a change in a state of a first user interface object indicates that a first user interface object that corresponds to the first communication group has gained input focus in order for the first interaction criteria to be met ⊢ 616

---

Temporarily enabling transmission of communications in the first communication group to the first client device without deactivating the message-on-hold mode for the first communication group includes:

sending a first status update to a server indicating to the server that the first interaction criteria are met with respect to the first communication group, wherein the server stores the first status update and temporarily enables transmission of communications in the first communication group to the first client device without deactivating the message-on-hold mode for the first communication group ⊢ 618

---

Preventing transmission of communications in the first communication group to the first client device includes:

sending a second status update to a server indicating to the server that the first interaction criteria are no longer met with respect to the first communication group, wherein the server stores the second status update and suspends transmission of communications in the first communication group to the first client device without deactivating the message-on-hold mode for the first communication group ⊢ 620

Activating the message-on-hold mode for the first communication group includes: — 622 notifying a server that the message-on-hold mode is activated with respect to the first communication group for the first user account, wherein, in response to being notified that the message-on-hold mode is activated for the first communication group for the first user account, the server changes a toggle state of the message-on-hold mode from a first state to a second state, and sets the status flag for the message-on-hold mode to a communication suspension state, wherein the server forgoes transmitting, to the first client device, communications that are sent within the first communication group by the one or more other user accounts

---

While the message-on-hold mode remains activated for the first communication group at the first client device and while transmission of communications is temporarily enabled without deactivating the message-on-hold mode for the first communication group, receive, from the server, at least one communication in the first communication group — 624

---

While the message-on-hold mode remains activated for the first communication group at the first client device, the first client device maintains display of a conversation list item that corresponds to the first communication group in a conversation listing of the social networking platform — 626

---

While the message-on-hold mode remains activated for the first communication group, the first user account remains within the first communication group and the server continues to transmit communications to one or more other members of the first communication group that have not activated the message-on-hold mode with respect to the first communication group — 628

While the message-on-hold mode remains activated for the first communication group at the first client device, and a locally stored status indicator for the message-on-hold mode indicates that communication from the first communication group is currently suspended, receive, at the first client device, one or more communications in the first communication group, from the server; and in response to receiving the one or more communications while the locally stored status indicator for the message-on-hold mode indicates that the communication from the first communication group is currently suspended, send a status correction request to the server to inform the server that communication from the first communication group is currently in a communication suspension state

Figure 6D

METHOD AND SYSTEM FOR CONTROLLING MESSAGE TRANSMISSION FOR A COMMUNICATION GROUP

CROSS-REFERENCE TO RELATED APPLICATIONS

This application is a continuation application of PCT/CN2017/095877, entitled "METHOD AND ELECTRONIC DEVICE AND STORAGE MEDIUM FOR CONTROLLING MESSAGE TRANSMISSION FOR A COMMUNICATION GROUP" filed on Aug. 3, 2017, which is incorporated by reference in its entirety.

FIELD OF THE TECHNOLOGY

The present disclosure relates to the field of Internet technologies, and in particular, to a method and system for controlling message transmission for a communication group, in particular, for dynamically suspending and resuming message transmission to a client device with regard to communications that have occurred in a respective communication group.

BACKGROUND OF THE TECHNOLOGY

The development of Internet technologies along with instant messaging tools and social networks make communication between people extremely convenient. A one-on-one communication function of a social network platform and its corresponding software applications facilitate one-on-one message exchanges between two users. A group communication function of a social network platform and its corresponding software applications facilitate message exchanges between multiple users. A public account on a social network platform provides communication broadcast to a group of followers. To ensure that a message posted by a user of a communication group reaches the other users in the group in a timely manner, a message or a notification related to the posted message may be pushed in real time to terminals of other users in the group. However, such push messages and/or notifications may result in sudden large influx of notifications and possibly disturb users in the group. A user may select to block group message notifications to avoid receiving notifications.

SUMMARY

As discussed in the background, a user may select to block group message notifications to avoid receiving notifications. However, if the user selects to block group message notifications, timely viewing and delivery of group messages is no longer ensured. Additionally, with conventional technologies, message content is typically pushed directly to a terminal and is displayed directly by the terminal along with the notification, which may result in a risk of information leakage and/or a security threat. The solutions disclosed herein may address the above deficiencies of the present technology.

As disclosed herein, in some embodiments, a message-on-hold mode can be individually activated or deactivated with respect to each conversation group of which a first user is a participant or follower, e.g., through a message-on-hold toggle control in the settings user interface of a client-side social network application. Once the message-on-hold mode is activated with respect to a first communication group (e.g., a group conversation, a one-on-one conversation, a public account forum, etc.), the client-device of the first user notifies the server about the activation of the message-on-hold mode for the first communication group, the server attaches a message-on-hold mode indicator for the user account of the first user on the server-side. The message-on-hold mode has a status flag that can be dynamically switched between a communication suspension state and a communication resumption state in accordance with updates received from the client device of the first user. The client device monitors the user's interaction with the device, and determines whether the user is currently showing interest in receiving information or communication from the first communication group based on predetermined behavior characteristics (e.g., when input focus is shifted to the conversation window or conversation list icon of the first communication group, the client device notifies the server of the change in the status of the message-on-hold mode from a communication suspension state to a communication resumption state without deactivating the message-on-hold mode; and when input focus is shifted away from the conversation window or conversation list icon of the first communication group, the client device notifies the server of the change in the status of the message-on-hold mode from the communication resumption state to the message suspension state without deactivating the message-on-hold mode). The server receiving the status update changes the status flag of the message-on-hold mode of the first communication group for the first user. In some embodiments, the client device only forwards user behavior data for predefined interactions to the server as the interactions are detected, and the server makes the determination regarding whether the status of the message-on-hold mode should be changed for the user. Each time a message or communication is generated in the first communication group, the server checks the message-on-hold mode indicators for all members of the communication group, and only transmits the message or communication to the members for which the status is in the communication resumption state. The automatic switching between the communication suspension state and the communication resumption state for the message-on-hold mode is based on user behavior, in particular, user's interaction with respect to the first communication group at the conversation group level, as opposed to the application level. In addition, activation of the message-on-hold mode does not require the user to leave the communication group, such that the user can still regain access to the messages that were withheld from the user during the communication suspension state. In addition, the activation of the message-on-hold mode also does not require the user to terminate social network relationship with any particular user, or block any particular user, thus, the user can continue to receive communications from other users that are members of the first communication group in other conversations, even though the communications from those members in the first group communication group is not being transmitted to the user due to the communication suspension state of the message-on-hold mode for the first communication group. When the message-on-hold mode is deactivated for the first communication group via the settings user interface, the server resumes transmission of communications in the first communication group without regard to the user's current interaction state with respect to the first communication group, provided that the user has not otherwise blocked the first communication group (e.g., blocked the other user in a one-on-one conversation) or exited the first communication group as a member (e.g. unfollowed a public account, or deleted the first communication group).

In some embodiments, a method of controlling message transmission for a communication group is performed at a first client device (e.g., client device 104-1, FIGS. 1 and 3) with one or more processors and memory. The method includes. A method of providing a social network environment, comprising at a first client device that is associated with a first user account of a social network platform: receiving a user instruction to activate a message-on-hold mode for a first communication group comprising the first user account and one or more other user accounts that are distinct from the first user account; in response to receiving the user instruction, activating the message-on-hold mode for the first communication group at the first client device; while the message-on-hold mode remains activated for the first communication group at the first client device: monitoring usage of the first client device by a user; detecting a first change in the usage of the first client device; and in response to detecting the first change in the usage of the first client device: in accordance with a determination that the first change in the usage of the first client device does not match first interaction criteria with respect to the first application or the first communication group, preventing transmission of communications in the first communication group to the first client device; and in accordance with a determination that the first change in the usage of the first client device matches the first interaction criteria with respect to the first application or the first communication group, temporarily enabling transmission of communications in the first communication group to the first client device without deactivating the message-on-hold mode for the first communication group.

In accordance with some embodiments, an electronic device includes a display, optionally a touch-sensitive surface, optionally one or more sensors to detect intensities of contacts with the touch-sensitive surface, optionally one or more tactile output generators, one or more processors, and memory storing one or more programs; the one or more programs are configured to be executed by the one or more processors and the one or more programs include instructions for performing or causing performance of the operations of any of the methods described herein. In accordance with some embodiments, a computer readable storage medium has stored therein instructions, which, when executed by an electronic device with a display, optionally a touch-sensitive surface, optionally one or more sensors to detect intensities of contacts with the touch-sensitive surface, and optionally one or more tactile output generators, cause the device to perform or cause performance of the operations of any of the methods described herein. In accordance with some embodiments, a graphical user interface on an electronic device with a display, optionally a touch-sensitive surface, optionally one or more sensors to detect intensities of contacts with the touch-sensitive surface, optionally one or more tactile output generators, a memory, and one or more processors to execute one or more programs stored in the memory includes one or more of the elements displayed in any of the methods described herein, which are updated in response to inputs, as described in any of the methods described herein. In accordance with some embodiments, an electronic device includes: a display, optionally a touch-sensitive surface, optionally one or more sensors to detect intensities of contacts with the touch-sensitive surface, and optionally one or more tactile output generators; and means for performing or causing performance of the operations of any of the methods described herein. In accordance with some embodiments, an information processing apparatus, for use in an electronic device with a display, optionally a touch-sensitive surface, optionally one or more sensors to detect intensities of contacts with the touch-sensitive surface, and optionally one or more tactile output generators, includes means for performing or causing performance of the operations of any of the methods described herein.

In some embodiments, a computing device (e.g., server system 108, FIGS. 1-2; client device 104, FIGS. 1 and 3; or a combination thereof) includes one or more processors and memory storing one or more programs for execution by the one or more processors, the one or more programs include instructions for performing, or controlling performance of, the operations of any of the methods described herein. In some embodiments, a non-transitory computer readable storage medium storing one or more programs, the one or more programs comprising instructions, which, when executed by a computing device (e.g., server system 108, FIGS. 1-2; client device 104, FIGS. 1 and 3; or a combination thereof) with one or more processors, cause the computing device to perform, or control performance of, the operations of any of the methods described herein. In some embodiments, a computing device (e.g., server system 108, FIGS. 1-2; client device 104, FIGS. 1 and 3; or a combination thereof) includes means for performing, or controlling performance of, the operations of any of the methods described herein.

Various advantages of the present application are apparent in light of the descriptions below.

BRIEF DESCRIPTION OF THE DRAWINGS

The aforementioned features and advantages of the disclosed technology as well as additional features and advantages thereof will be more clearly understood hereinafter as a result of a detailed description of preferred embodiments when taken in conjunction with the drawings.

To describe the technical solutions in the embodiments of the present disclosed technology or in the prior art more clearly, the following briefly introduces the accompanying drawings required for describing the embodiments or the prior art. Apparently, the accompanying drawings in the following description show merely some embodiments of the present disclosed technology, and persons of ordinary skill in the art may still derive other drawings from these accompanying drawings without creative efforts.

FIGS. 6A-6D illustrates a flowchart diagram of a method of controlling message transmission for a communication group in accordance with some embodiments.

Like reference numerals refer to corresponding parts throughout the several views of the drawings.

DESCRIPTION OF EMBODIMENTS

Reference will now be made in detail to embodiments, examples of which are illustrated in the accompanying drawings. In the following detailed description, numerous specific details are set forth in order to provide a thorough understanding of the subject matter presented herein. But it will be apparent to one skilled in the art that the subject matter may be practiced without these specific details. In other instances, well-known methods, procedures, components, and circuits have not been described in detail so as not to unnecessarily obscure aspects of the embodiments.

The following clearly and completely describes the technical solutions in the embodiments of the present application with reference to the accompanying drawings in the embodiments of the present application. Apparently, the described embodiments are merely a part rather than all of the embodiments of the present application. All other embodiments obtained by persons of ordinary skill in the art based on the embodiments of the present application without creative efforts shall fall within the protection scope of the present application.

Figure 1:
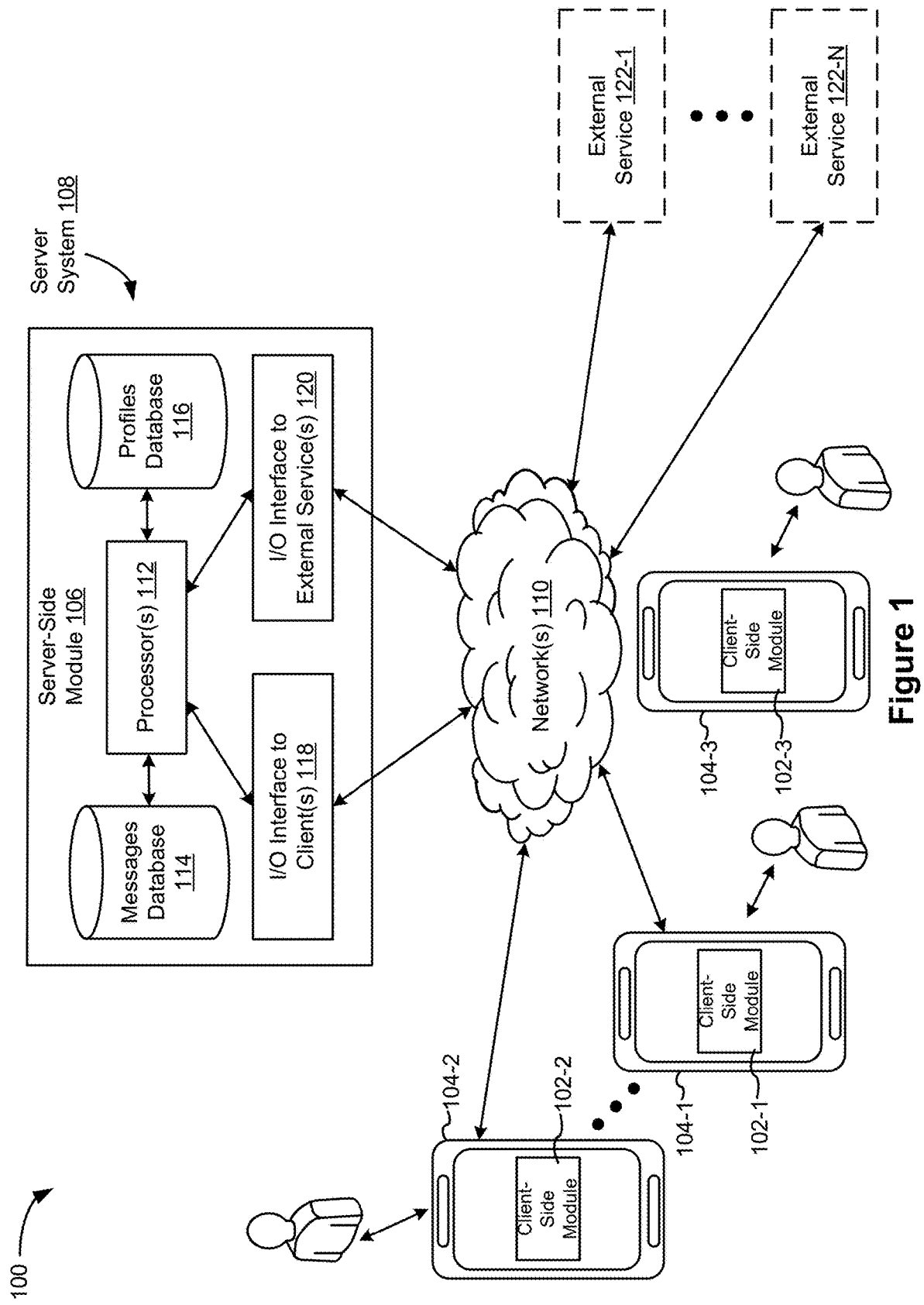
FIG. 1 is a block diagram of a server-client environment in accordance with some embodiments.

As shown in FIG. 1, data processing for a social networking platform is implemented in a server-client environment 100 in accordance with some embodiments. In accordance with some embodiments, server-client environment 100 includes client-side processing 102-1, 102-2, 102-3 (hereinafter "client-side modules 102") executed on a client device 104-1, 104-2, 104-3 and server-side processing 106 (hereinafter "server-side module 106") executed on a server system 108. Client-side module 102 communicates with server-side module 106 through one or more networks 110. Client-side module 102 provides client-side functionalities for the social networking platform and communications with server-side module 106. Server-side module 106 provides server-side functionalities for the social networking platform for any number of client modules 102 each residing on a respective client device 104.

In some embodiments, server-side module 106 includes one or more processors 112, messages database 114, profiles database 116, an I/O interface to one or more clients 118, and an I/O interface to one or more external services 120. I/O interface to one or more clients 118 facilitates the client-facing input and output processing for server-side module 106. In some embodiments, processor(s) 112 send special notifications to user(s) subscribed to a group chat that are mentioned in a group message. Messages database 114 stores messages sent by users in the social networking platform, and profiles database 116 stores user profiles for users of the social networking platform. I/O interface to one or more external services 120 facilitates communications with one or more external services 122 (e.g., web servers or cloud-based service providers such as video and/or image hosting and storage websites).

Examples of client device 104 include, but are not limited to, a handheld computer, a wearable computing device, a personal digital assistant (PDA), a tablet computer, a laptop computer, a desktop computer, a cellular telephone, a smart phone, an enhanced general packet radio service (EGPRS) mobile phone, a media player, a navigation device, a game console, a television, a remote control, a point of sale (POS) terminal, vehicle-mounted computer, an ebook reader, or a combination of any two or more of these data processing devices or other data processing devices.

Examples of one or more networks 110 include local area networks (LAN) and wide area networks (WAN) such as the Internet. One or more networks 110 are, optionally, implemented using any known network protocol, including various wired or wireless protocols, such as Ethernet, Universal Serial Bus (USB), FIREWIRE, Long Term Evolution (LTE), Global System for Mobile Communications (GSM), Enhanced Data GSM Environment (EDGE), code division multiple access (CDMA), time division multiple access (TDMA), Bluetooth, Wi-Fi, voice over Internet Protocol (VoIP), Wi-MAX, or any other suitable communication protocol.

Server system 108 is implemented on one or more stand-alone data processing apparatuses or a distributed network of computers. In some embodiments, server system 108 also employs various virtual devices and/or services of third party service providers (e.g., third-party cloud service providers) to provide the underlying computing resources and/or infrastructure resources of server system 108. In some embodiments, server system 108 includes, but is not limited to, a handheld computer, a tablet computer, a laptop computer, a desktop computer, or a combination of any two or more of these data processing devices or other data processing devices.

Server-client environment 100 shown in FIG. 1 includes both a client-side portion (e.g., client-side module 102) and a server-side portion (e.g., server-side module 106). In some embodiments, data processing is implemented as a stand-alone application installed on client device 104. In addition, the division of functionalities between the client and server portions of client-server environment 100 can vary in different embodiments. For example, in some embodiments, client-side module 102 is a thin-client that provides only user-facing input and output processing functions, and delegates all other data processing functionalities to a backend server (e.g., server system 108). Although many aspects of the present technology are described from the perspective of the server, the corresponding actions performed by the client device would be apparent to ones skilled in the art without any creative efforts. Furthermore, some aspects of the present technology may be performed by the server, the client device, or the server and the client cooperatively.

Figure 2:
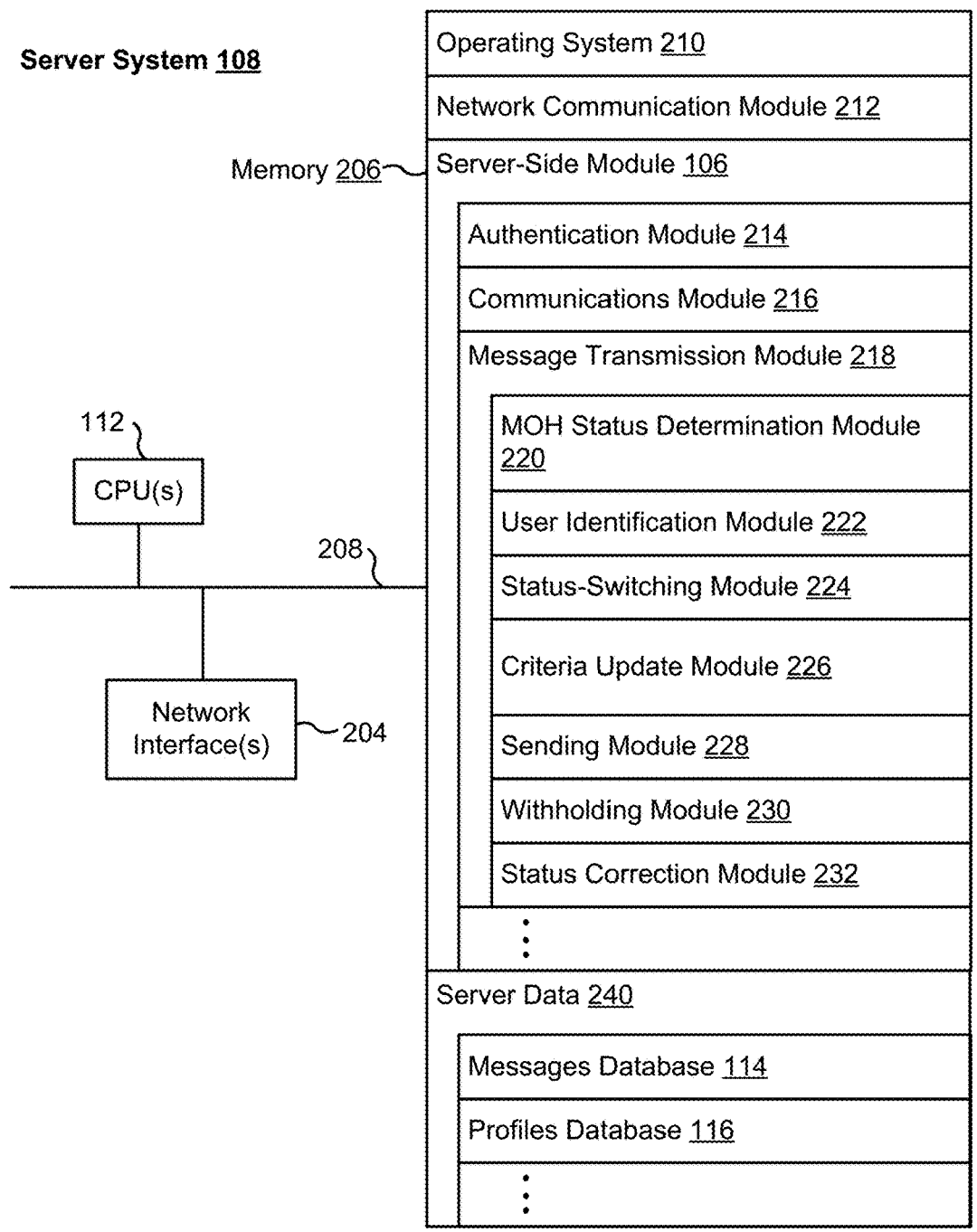
FIG. 2 is a block diagram of a server system in accordance with some embodiments.

FIG. 2 is a block diagram illustrating server system 108 in accordance with some embodiments. Server system 108, typically, includes one or more processing units (CPUs) 112, one or more network interfaces 204 (e.g., including I/O interface to one or more clients 118 and I/O interface to one or more external services 120), memory 206, and one or more communication buses 208 for interconnecting these components (sometimes called a chipset). Memory 206 includes high-speed random access memory, such as DRAM, SRAM, DDR RAM, or other random access solid state memory devices; and, optionally, includes non-volatile memory, such as one or more magnetic disk storage devices, one or more optical disk storage devices, one or more flash memory devices, or one or more other non-volatile solid state storage devices. Memory 206, optionally, includes one or more storage devices remotely located from one or more processing units 112. Memory 206, or alternatively the non-volatile memory within memory 206, includes a non-transitory computer readable storage medium. In some implementations, memory 206, or the non-transitory computer readable storage medium of memory 206, stores the following programs, modules, and data structures, or a subset or superset thereof:

operating system 210 including procedures for handling various basic system services and for performing hardware dependent tasks;
network communication module 212 for connecting server system 108 to other computing devices (e.g., client devices 104 and external service(s) 122) connected to one or more networks 110 via one or more network interfaces 204 (wired or wireless);

server-side module 106, which provides server-side data processing and functionalities for the recording application, including but not limited to:
authentication module 214 for authenticating users associated with client devices 104 to use the social networking platform;
communications module 216 for managing and routing messages sent between users of the social networking platform;
message transmission module 218 for sending notifications regarding messaging activity in a group messaging feature of the social networking platform (e.g., a group chat, a public group, etc.), and transmitting messages to the client devices associated with participants of various communication groups, including but not limited to:
message-on-hold mode status determination module 220 for determining the status of the message-on-hold mode with respect to a communication group for each user subscribing to the communication group in response to obtaining a group message sent to the users subscribed to the communication group;
user identification module 222 for identifying one or more users that are members of a communication group;
status-switching module 224 for obtaining updates from client devices regarding the status of the message-on-hold mode with respect to a communication group, and setting the status flag between a communication suspension state to a communication resumption state in accordance with the status updates received from the client devices;
criteria update module 226 for notifying the client devices that have activated the message-on-hold mode for one or more communication groups regarding the communication resumption criteria and the communication suspension criteria that the client devices should use to determine whether a status update between the communication suspension state and the communication resumption state needs to be sent by the client devices;
sending module 228 for sending communications in various communication groups to the client devices in accordance with the respective statuses of the message-on-hold mode for the various communication groups at the client devices participating in the various communication groups; and
withholding module 230 for withholding transmission of communications in various communication groups to the client devices in accordance with the respective statuses of the message-on-hold mode for the various communication groups at the client devices participating in the various communication groups; and
(optionally) status correction module 232 for correcting the statuses of the message-on-hold mode for the various communication groups for various user accounts participating in the various communication groups based on status correction requests received from client devices corresponding to those user accounts; and
server data 240 storing data for the software testing application, including but not limited to:
messages database 114 storing messages sent by users in the social networking platform; and
profiles database 116 storing user profiles for users of the social networking platform, where a respective user profile for a user includes a user identifier (e.g., an account name or handle), login credentials to the social networking platform, an IP address or preferred contact information, status of a message-on-hold mode for various communication groups for each user account, a notification privacy setting, listing of communication groups subscribed by each user account, contacts list, custom parameters for the user (e.g., age, location, hobbies, etc.), and identified trends and/or likes/dislikes of the user.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise re-arranged in various implementations. In some implementations, memory 206, optionally, stores a subset of the modules and data structures identified above. Furthermore, memory 206, optionally, stores additional modules and data structures not described above.

Figure 3:
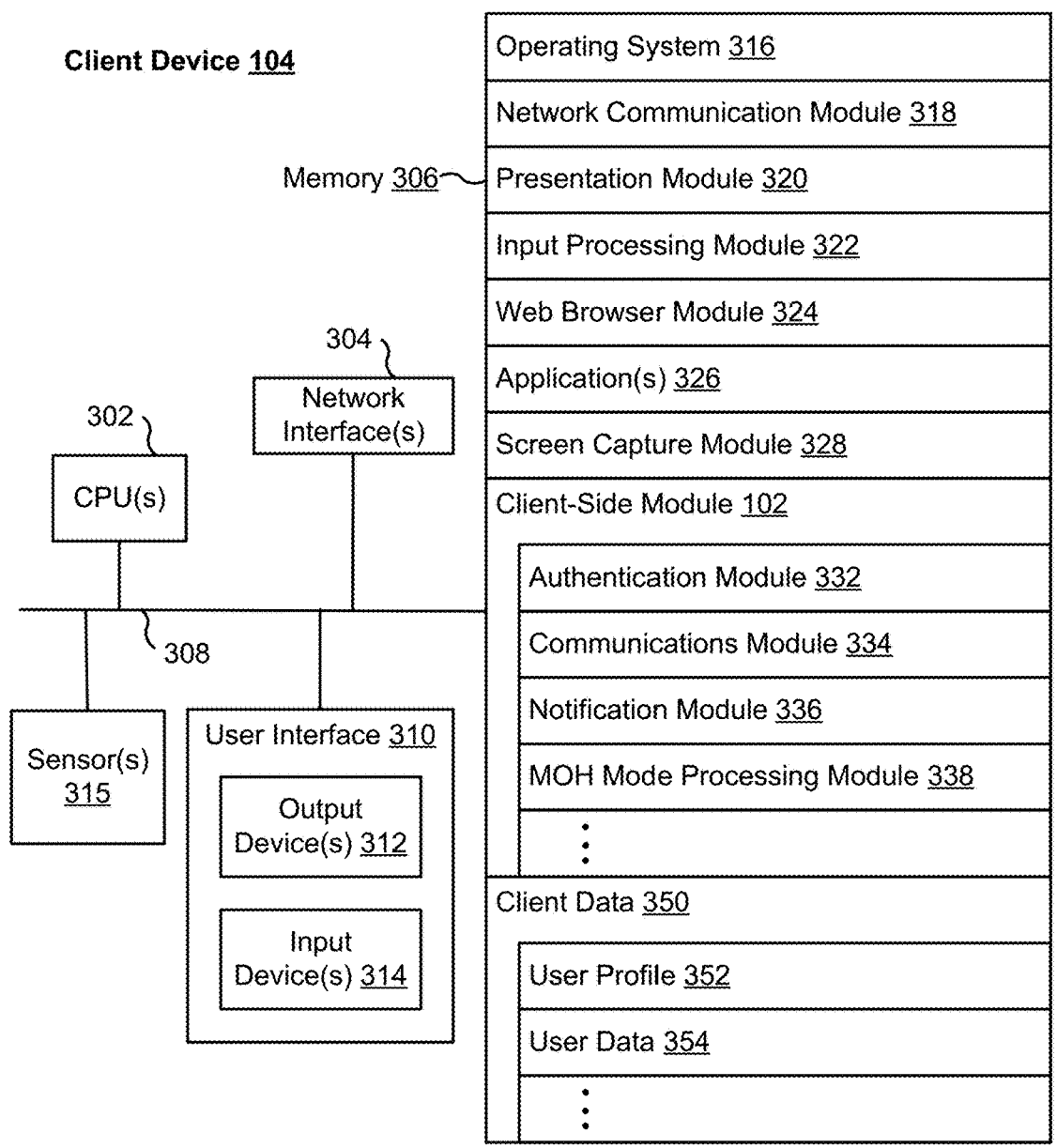
FIG. 3 is a block diagram of a client device in accordance with some embodiments.

FIG. 3 is a block diagram illustrating a representative client device 104 associated with a user in accordance with some embodiments. Client device 104, typically, includes one or more processing units (CPUs) 302, one or more network interfaces 304, memory 306, and one or more communication buses 308 for interconnecting these components (sometimes called a chipset). Client device 104 also includes a user interface 310. User interface 310 includes one or more output devices 312 that enable presentation of media content, including one or more speakers and/or one or more visual displays. User interface 310 also includes one or more input devices 314, including user interface components that facilitate user input such as a keyboard, a mouse, a voice-command input unit or microphone, a touch screen display, a touch-sensitive input pad, a gesture capturing camera, or other input buttons or controls. Furthermore, some client devices 104 use a microphone and voice recognition or a camera and gesture recognition to supplement or replace the keyboard. In some embodiments, client device 104 further includes sensors 315, which provide context information as to the current state of client device 104 or the environmental conditions associated with client device 104. Sensors 315 include but are not limited to one or more microphones, one or more cameras, an ambient light sensor, one or more accelerometers, one or more gyroscopes, a GPS positioning system, a Bluetooth or BLE system, a temperature sensor, one or more motion sensors, one or more biological sensors (e.g., a galvanic skin resistance sensor, a pulse oximeter, and the like), and other sensors. Memory 306 includes high-speed random access memory, such as DRAM, SRAM, DDR RAM, or other random access solid state memory devices; and, optionally, includes non-volatile memory, such as one or more magnetic disk storage devices, one or more optical disk storage devices, one or more flash memory devices, or one or more other non-volatile solid state storage devices. Memory 306, optionally, includes one or more storage devices remotely located from one or more processing units 302. Memory 306, or alternatively the non-volatile memory within memory 306, includes a non-transitory computer readable storage medium. In some implementations, memory 306, or the non-transitory computer readable storage medium of memory 306, stores the following programs, modules, and data structures, or a subset or superset thereof:

- operating system 316 including procedures for handling various basic system services and for performing hardware dependent tasks;
- network communication module 318 for connecting client device 104 to other computing devices (e.g., server system 108 and external service(s) 122) connected to one or more networks 110 via one or more network interfaces 304 (wired or wireless);
- presentation module 320 for enabling presentation of information (e.g., a user interface for application(s) 326 or the social networking platform, widgets, websites and web pages thereof, and/or games, audio and/or video content, text, etc.) at client device 104 via one or more output devices 312 (e.g., displays, speakers, etc.) associated with user interface 310;
- input processing module 322 for detecting one or more user inputs or interactions from one of the one or more input devices 314 and interpreting the detected input or interaction;
- web browser module 324 for navigating, requesting (e.g., via HTTP), and displaying websites and web pages thereof;
- one or more applications 326 for execution by client device 104 (e.g., games, application marketplaces, payment platforms, and/or other web or non-web based applications);
- client-side module 102, which provides client-side data processing and functionalities for the social networking platform, including but not limited to:
  - authentication module 332 for authenticating the user of client device 104 to access his/her account in the social networking platform;
  - communications module 334 for sending messages to and receiving messages from other users of the social networking platform (e.g., instant messaging, group chat, message board, message/news feed, and the like);
  - notification module 336 for displaying a notification regarding messaging activity in a group messaging feature of the social networking platform (e.g., a group chat); and
  - message-on-hold mode processing module 338 for monitoring inputs and changes in the client device that activates, deactivates the message-on-hold mode for one or more communication groups associated with a user account of the client device, monitoring user interactions with the device to determine whether communication for a respective communication group should be suspended or resumed while the message-on-hold mode remains activated for the communication group, and
  sending status updates when communication suspension or resumption states for a communication group is changed based on predefined communication suspension criteria and communication resumption criteria,
  and sending status correction request to the server when communications for a communication group is received from the server when the communication for the communication group is currently in the suspended state; and
- client data 350 storing data associated with the social networking platform, including, but is not limited to:
  - user profile 352 storing a user profile associated with the user of client device 104 for the social networking platform, including a user identifier (e.g., an account name or handle), login credentials to the social networking platform, (optionally) payment data (e.g., linked credit card information, app credit or gift card balance, billing address, shipping address, etc.), an IP address or preferred contact information, status of a message-on-hold mode for each communication group of the user account of the client device, a notification privacy setting, environmental condition(s), a listing of communication groups subscribed to, contacts list, custom parameters for the user (e.g., age, location, hobbies, etc.), and identified trends and/or likes/dislikes of the user; and
  - user data 354 storing data authored, saved, liked, or chosen as favorites by the user of client device 104 in the social networking platform.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, modules or data structures, and thus various subsets of these modules may be combined or otherwise re-arranged in various implementations. In some implementations, memory 306, optionally, stores a subset of the modules and data structures identified above. Furthermore, memory 306, optionally, stores additional modules and data structures not described above.

In some embodiments, at least some of the functions of server system 108 are performed by client device 104, and the corresponding sub-modules of these functions may be located within client device 104 rather than server system 108. In some embodiments, at least some of the functions of client device 104 are performed by server system 108, and the corresponding sub-modules of these functions may be located within server system 108 rather than client device 104. Client device 104 and server system 108 shown in FIGS. 2-3, respectively, are merely illustrative, and different configurations of the modules for implementing the functions described herein are possible in various embodiments.

Attention is now directed towards embodiments of user interfaces and associated processes that may be implemented on a client device 104 with a touch screen (sometimes also herein called a "touch screen display") enabled to receive one or more touch inputs and display information (e.g., media content, websites and web pages thereof, and/or user interfaces for an application such as a web browser and the first and second social networking platform applications). FIGS. 4A-4I illustrate exemplary user interfaces for controlling message communication for a communication group over a social networking platform in accordance with some embodiments.

FIGS. 4A, 4B, 4D, 4E, 4H and 4I show a user interface displayed on a first client device 104-1 (e.g., a mobile phone) executing the social networking platform (e.g., client-side module 102, FIGS. 1 and 3) that is associated with a first user; however, one skilled in the art will appreciate that the user interfaces shown in these Figures may be implemented on other similar computing devices. FIGS. 4C, 4F, and 4G show a user interface displayed on a second client device 104-2 (e.g., a mobile phone) executing the social networking platform (e.g., client-side module 102, FIGS. 1 and 3) that is associated with a second user; however, one skilled in the art will appreciate that the user interfaces shown in these Figures may be implemented on other similar computing devices. The contrast between these figures illustrate the operation of the message-on-hold mode, and dynamic switching between a communication suspension state and a communication resumption state of the message-on-hold mode at the first client device. The user interfaces in FIGS. 4A-4I are used to illustrate the methods described in FIGS. 5, and 6A-6D.

Figure 4A:
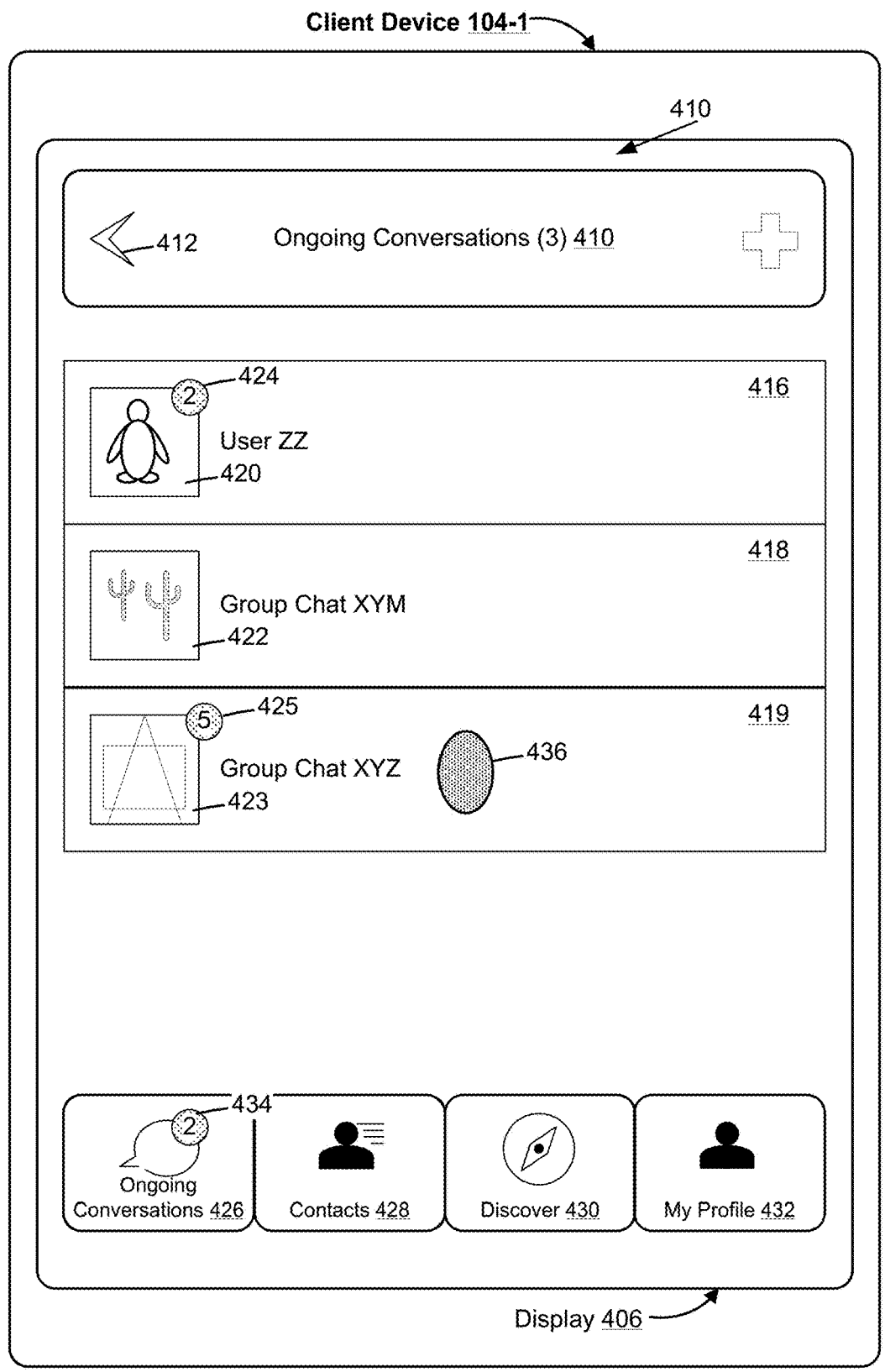
FIGS. 4A-4I illustrate exemplary user interfaces for controlling message transmission for a communication group of a social networking platform in accordance with some embodiments.

FIG. 4A illustrates first client device 104-1 displaying an interface 410 for a chat application that is associated with a social network platform. The interface 410 is a conversation listing interface and lists the conversation groups (e.g., one-on-one conversation group with user ZZ 416, group conversation XYM 418, and group conversation XYZ 419) that a user account (e.g., user XX) associated with the first client device is currently a member/participant/follower. In FIG. 4A, conversation listing interface 410 enables the user of first client device 104-1 (e.g., user XX) to view messages in a respective conversation group (e.g., conversation groups 416, 418, and 419) by selecting the list icon (e.g., 416, 418, or 419) of the conversation group. In some embodiments, in a desktop environment, double clicking on the list icon for a conversation group, opens a conversation window for the selected conversation group. In FIG. 4A, conversation 416 corresponds to a conversation between user XX and user ZZ whose avatar 420 is displayed in the region for conversation 416. The region for conversation 416 also includes unread messages indicator 424 indicating that user XX has two unread messages from user ZZ within conversation 416. As new messages arrive in the conversation group, the unread messages indicator is updated to shown the current number of new messages in the conversation group (e.g., when the message-on-hold mode is not activated for the conversation group). In FIG. 4A, conversations 418 and 419 correspond to group chats with groups XYM and XYZ respectively to which user XX is a member. Indicator 425 indicates that there are currently five unread messages in the group conversation XYZ, and the indicator is continually updated as new messages are generated in the conversation group XYZ. In FIG. 4A, avatar 422 corresponds to group chat XYM and avatar 423 corresponds to group chat XYZ.

In FIG. 4A, conversation listing interface 410 also includes back affordance 412, which, when activated (e.g., with a tap gesture), causes first client device 104-1 to display a previous interface (e.g., a home interface for the social networking platform from which conversation listing interface 410 was reached by the user of first client device 104-1) and conversation addition affordance (e.g., a plus sign), which, when activated (e.g., with a tap gesture), causes first client device 104-1 to display a dialog for initiating a new conversation. In FIG. 4A, conversations listing interface 410 further includes: ongoing conversations affordance 426, which, when activated (e.g., with a tap gesture), causes first client device 104-1 to display conversation listing interface 410; indicator 434 on the affordance 426 displays the total number of new messages from all conversation groups of the user XX. contacts affordance 428 which, when activated (e.g., with a tap gesture), causes first client device 104-1 to display a contact list corresponding to the user of first client device 104-1; discover affordance 430, which, when activated (e.g., with a tap gesture), enables the user of first client device 104-1 to discover new contacts; and my profile affordance 432 which, when activated (e.g., with a tap gesture), causes first client device 104-1 to display a profile page corresponding to the user of first client device 104-1 (e.g., user XX). The user interface shown in FIG. 4A is displayed when the user has not activated the message-on-hold mode for the first conversation group XYZ, so messages notifications (e.g., banner notifications) can be displayed as messages comes in from the conversation group XYZ.

Figure 4B:
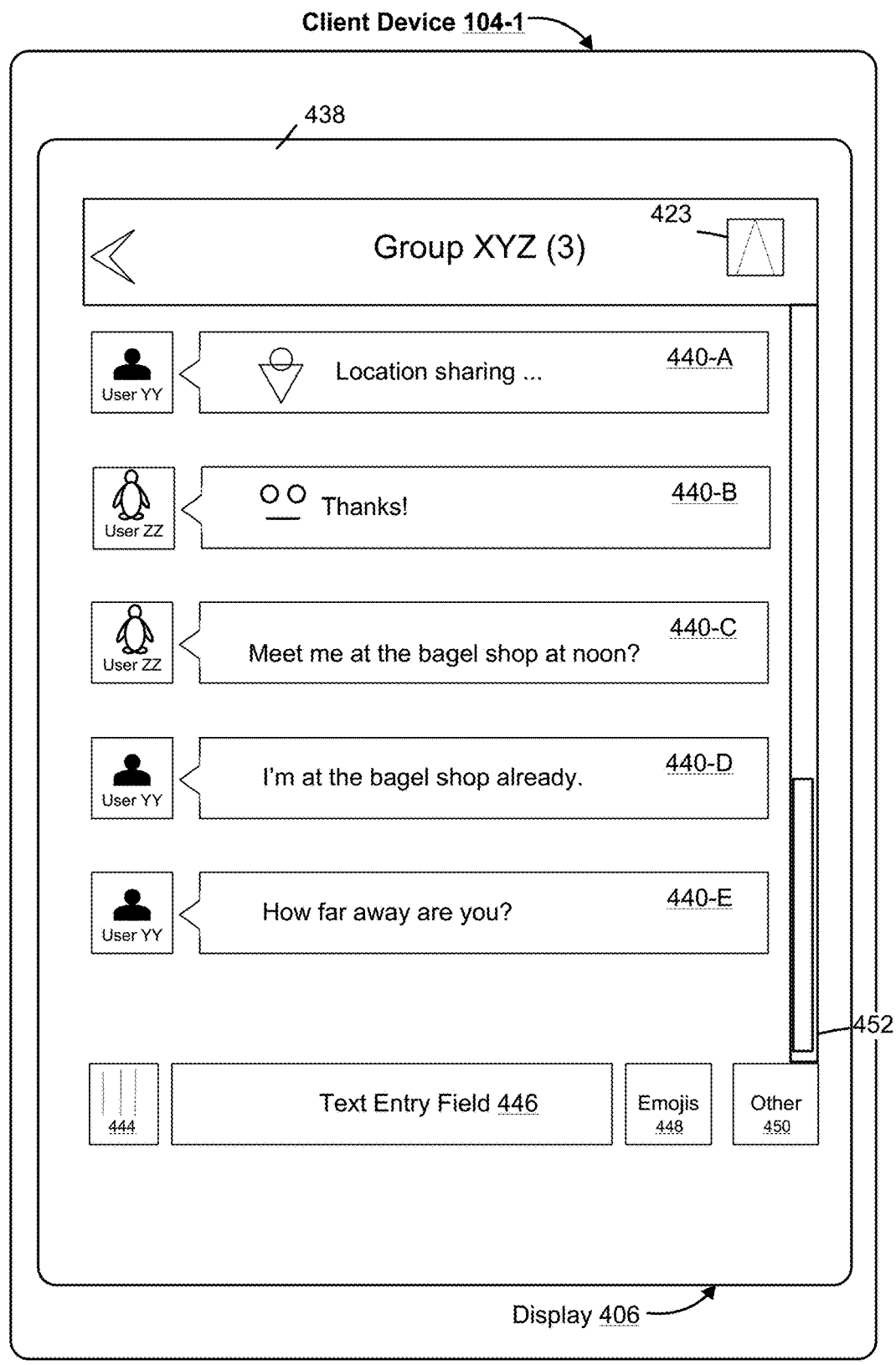
Figure 4C:
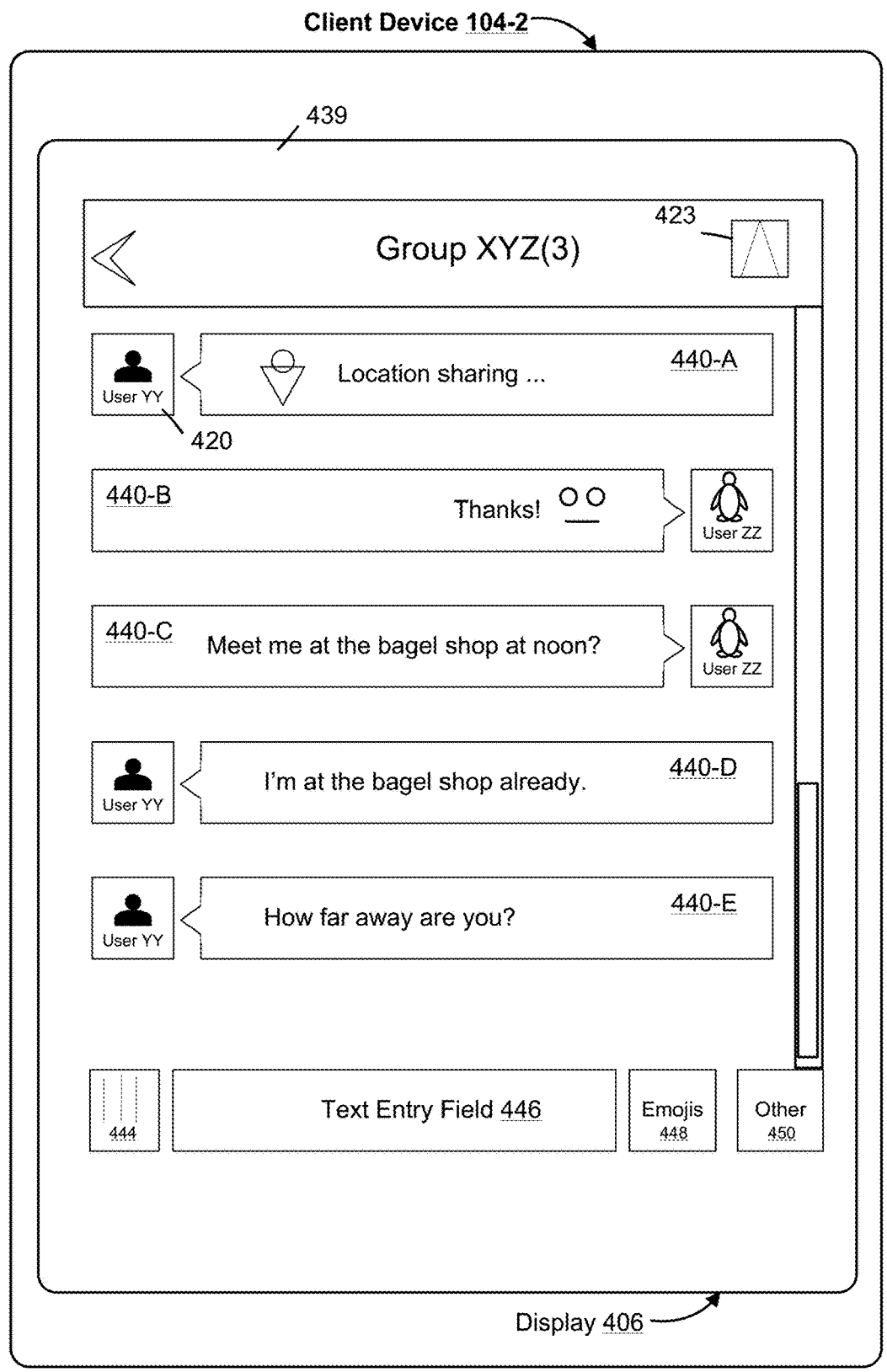

FIG. 4B illustrates first client device 104-1 displaying a conversation interface 438 for the group conversation XYZ between user XX (e.g., the user of first client device 104-1), user ZZ (e.g., the user of second client device 104-2), and user YY (e.g., the user of a third client device 104-3) in response detecting selection of the region for group conversation 419 in FIG. 4A. In FIG. 4B, conversation interface 438 includes a back affordance, which, when activated (e.g., with a tap gesture), causes first client device 104-1 to display a previous interface (e.g., conversation listing interface 410 in FIG. 4A) and avatar 423 corresponding to the conversation group XYZ. In FIG. 4B, conversation interface 438 also includes a plurality of messages 440 that user YY and user ZZ send to the group XYZ, including messages 440-A, 440-D, and 440-E sent by user YY and messages 440-B and 440-C sent by user ZZ. In FIG. 4B, the conversation interface 438 further includes: affordance 444 for recording a voice message; text entry field 446 for entering a text message; emojis affordance 448, which, when activated (e.g., with a tap gesture), causes first client device 104-1 to display a plurality of emojis; and other features affordance 450, which, when activated (e.g., with a tap gesture), causes first client device 104-1 to display a plurality of other features. In FIG. 4B, conversation interface 438 further includes scroll bar 452 for scrolling the display region of the messages to displaying older messages sent between user XX, YY, and ZZ in the conversation group XYZ. In a desktop computer embodiment, the user may open conversation windows of multiple group conversations, and selecting the window for one conversation causes the window of that conversation window to become a foreground window, and causes other conversation windows to become background windows.

In FIG. 4B, since the message-on-hold mode has not been activated for the conversation group XYZ for user XX at the first client device 104-1, as user YY and user ZZ continue to send messages to the group XYZ, the messages will be displayed in substantially real-time in the message window shown in FIG. 4B. In some embodiments, if the user of the first client device 104-1 exits back to the conversation listing interface 410, the messages in the group conversation XYZ will continue to be received in substantially real-time and a notification indicator 425 that indicates the current number of new messages in the group conversation XYZ will be continuously updated as new messages are generated in the conversation group (e.g., by users YY and ZZ). In some embodiments, when the user is displaying the conversation interface of another conversation group (e.g., group conversation XYM), notifications regarding the new messages received for group conversation XYZ may continue to arrive at the first client device, impacting the user's participation or review of the conversation in the currently displayed conversation group.

FIG. 4C illustrates a conversation interface 439 for the group conversation XYZ that is displayed on the client device 102-2 used by user ZZ. The conversation interface 439 shows the same set of messages 440 from the users YY and ZZ, but with a different arrangement, because some of the messages are sent out from the user ZZ himself, from the client device 104-2. The user ZZ does not have the message-on-hold activated, so messages that are generated in the group are received in substantially real-time at client device 102-4.

Figure 4D:
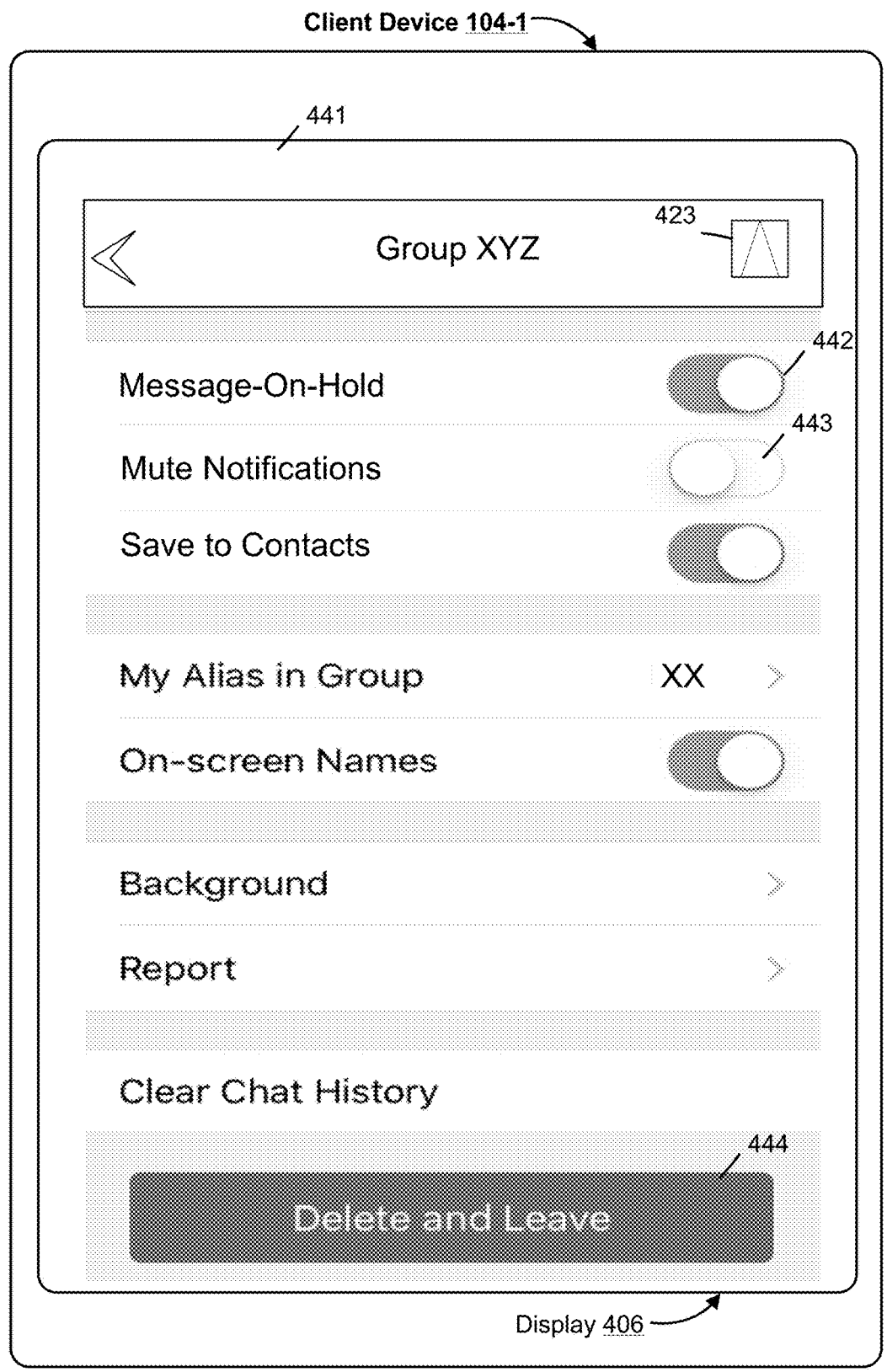

FIG. 4D illustrate a settings user interface 441 for controlling various aspect of the social network application in relation to the first communication group for the user account for user XX. The settings user interface can be displayed when the user taps on the group avatar 423 shown in FIG. 4B, for example. Within the settings user interface 441, the user can turn on the message-on-hold mode for the conversation group XYZ using the toggle control 442. In some embodiments, the user may also independently mute notifications (e.g., using the toggle control 443) for the messages independently of the ON/OFF state of the message-on-hold mode. The user may also leave and delete the conversation group XYZ by selecting the deletion affordance 444 in the settings user interface. Once the conversation group XYZ is deleted for the user XX, the user XX is no longer a member of the conversation XYZ, and will not receive further communications from the group. On the device of other members of the conversation group, the user XX's avatar will no longer be included, and user XX will no longer be able to send messages to the group XYZ.

Figure 4E:
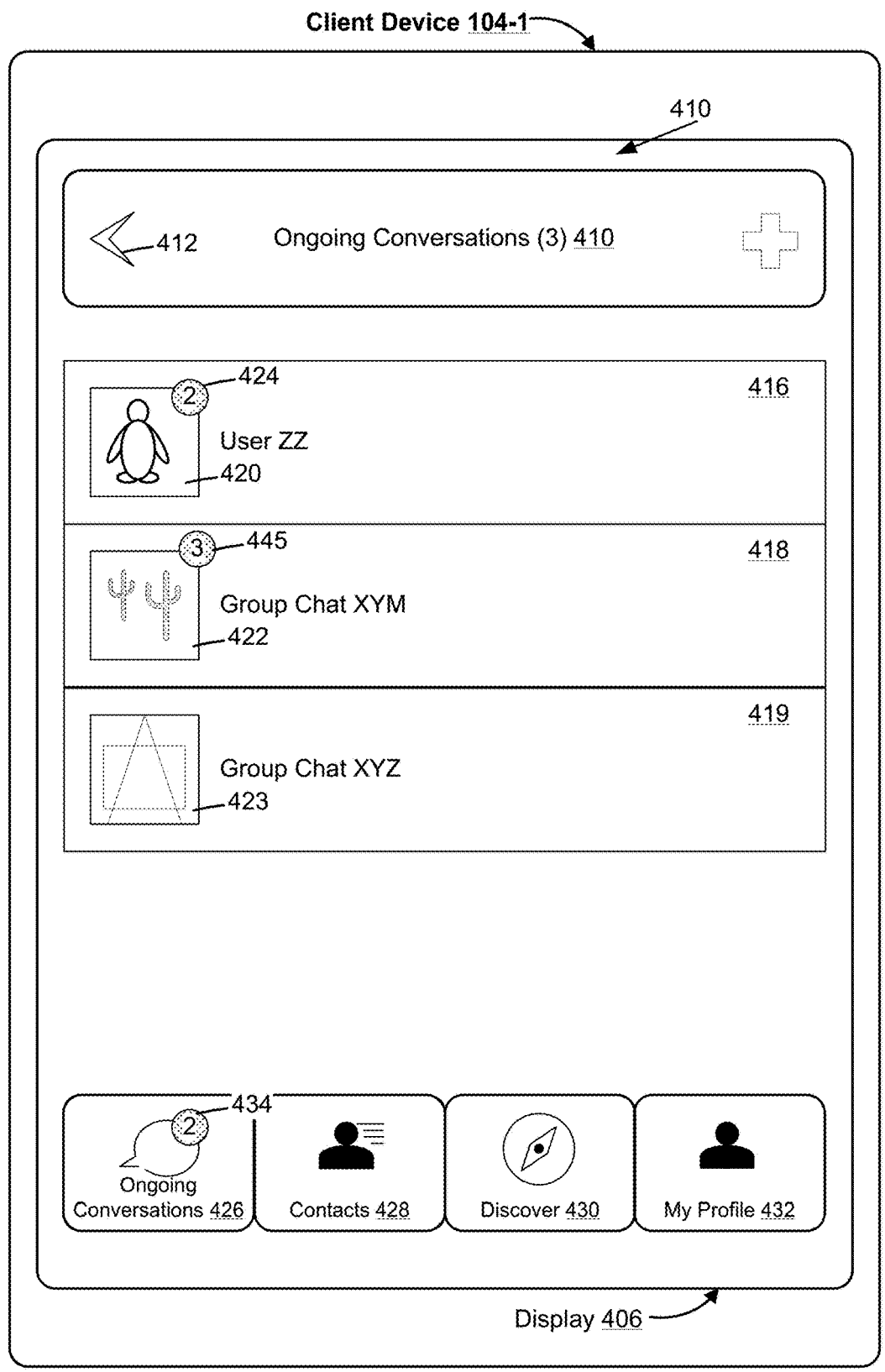
Figure 4F:
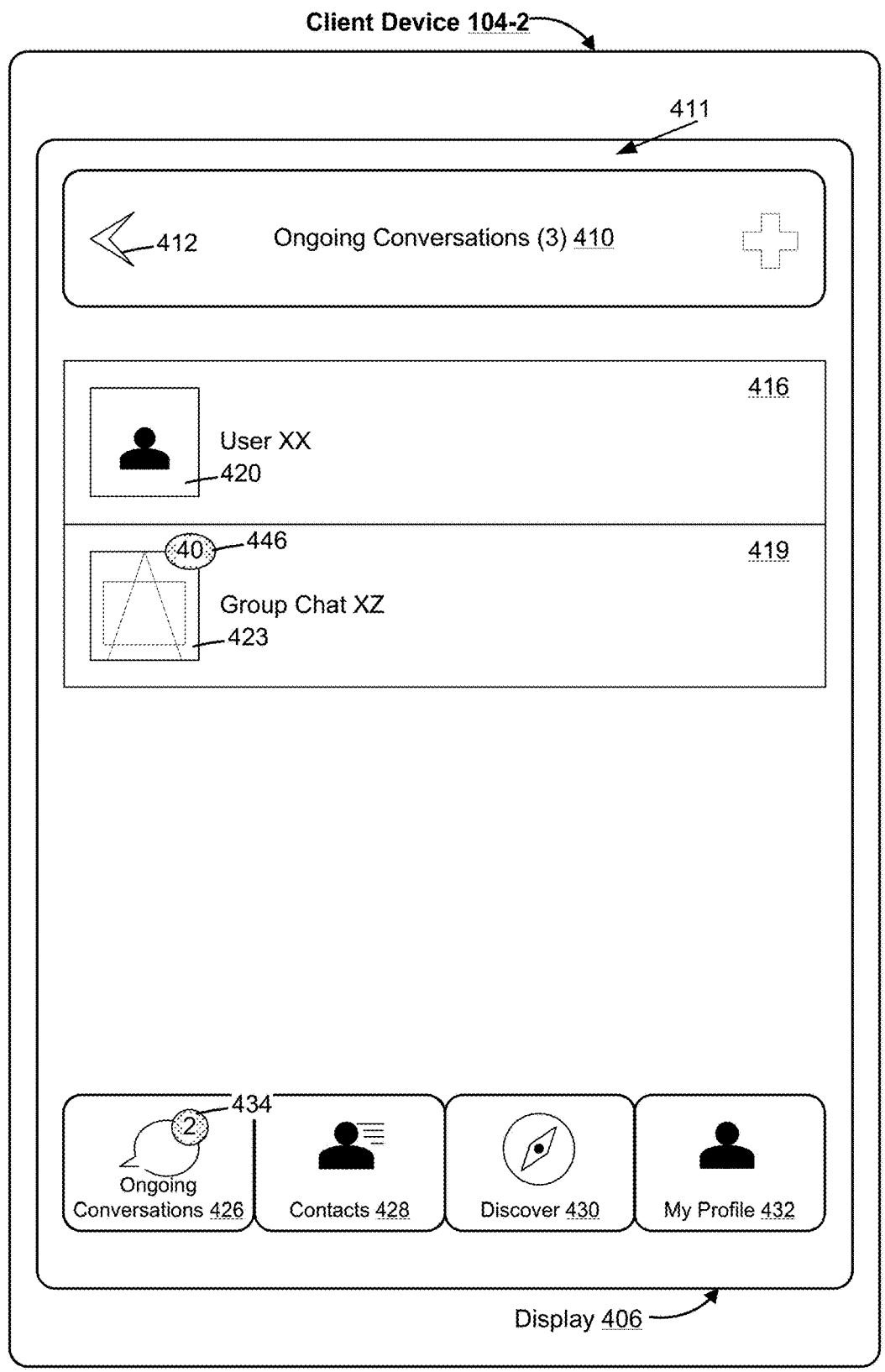
Figure 4G:
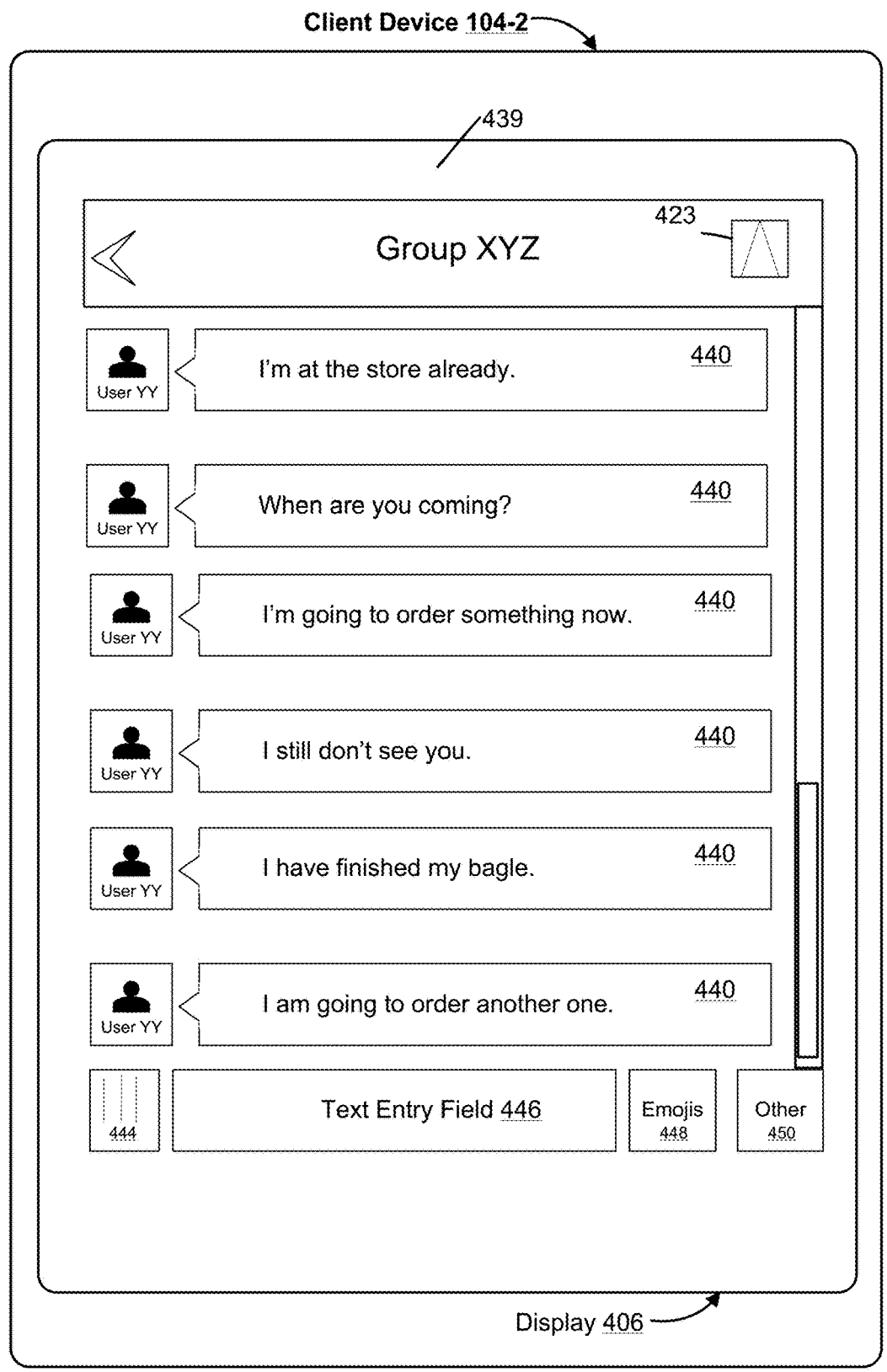

FIG. 4E illustrates the state of the conversation listing interface 410 after the user has activated the message-on-hold mode for group conversation XYZ. New messages generated in the conversation group XYZ (e.g., by users YY and ZZ) are no longer received at the client device 104-1, and no notification for any new messages are displayed in the conversation listing user interface 410 even though the notification may be turned on for the first communication group. In some embodiments, if notification is not separately controlled for the communication group, the message-on-hold control may also serve as the notification control. In some embodiments, instead of preventing message receipt or resume message receipt based on the user interaction detected during the message-on-hold mode, the server still sends the messages to the first client device, but the first client device only displays notifications for the received messages when the interactions detected match the criteria to resume message receipt (in that case, the communication resumption state would be replaced with a notification resumption state, and similarly, the communication suspension state would be replaced with a notification suspension state, and the message-on-hold mode may be referred to as a notification-on-hold mode, similar disclosures regarding the message-on-hold mode would be applicable to the notification-on-hold mode, and the processes may be accomplished without server-side support. In the interest of brevity, the discussions are not repeated for the notification-on-hold mode herein).

FIG. 4F shows the conversation listing user interface 411 displayed on the client device 104-2 of the user ZZ, in contrast to the conversation listing user interface 410 displayed on the client device 104-1 of the user ZZ at the same time. As shown in FIG. 4F, while no message and/or message notification is displayed for the conversation group XYZ for the user XX at client device 104-1, the receipt of messages and display of notifications is ongoing normally for user ZZ at device 104-2. In this example, the user ZZ has received forty new messages in group conversation XYZ (e.g., sent by user YY) since the time that the user ZZ last viewed the messages in group conversation XYZ. The indicator 446 shows the number of unread messages for the group conversation XYZ.

FIG. 4G illustrates that, once the user ZZ selects the conversation group XYZ (e.g., by click on the icon 419), conversation interface 439 is displayed again showing the recent messages 440 that have been generated in the conversation group XYZ. These are the messages that have not been delivered to the user XX to client device 104-1.

Figure 4H:
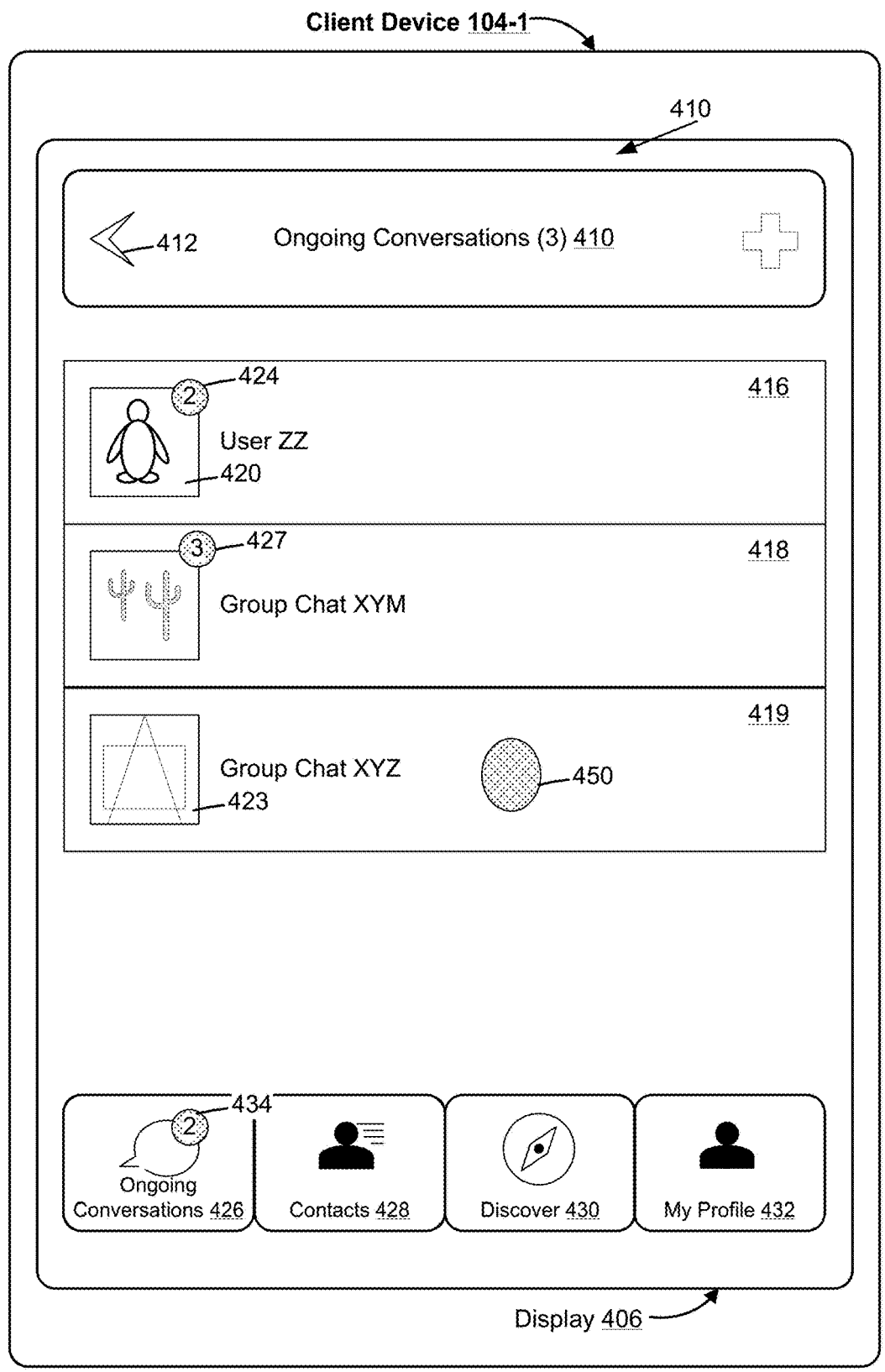
Figure 4I:
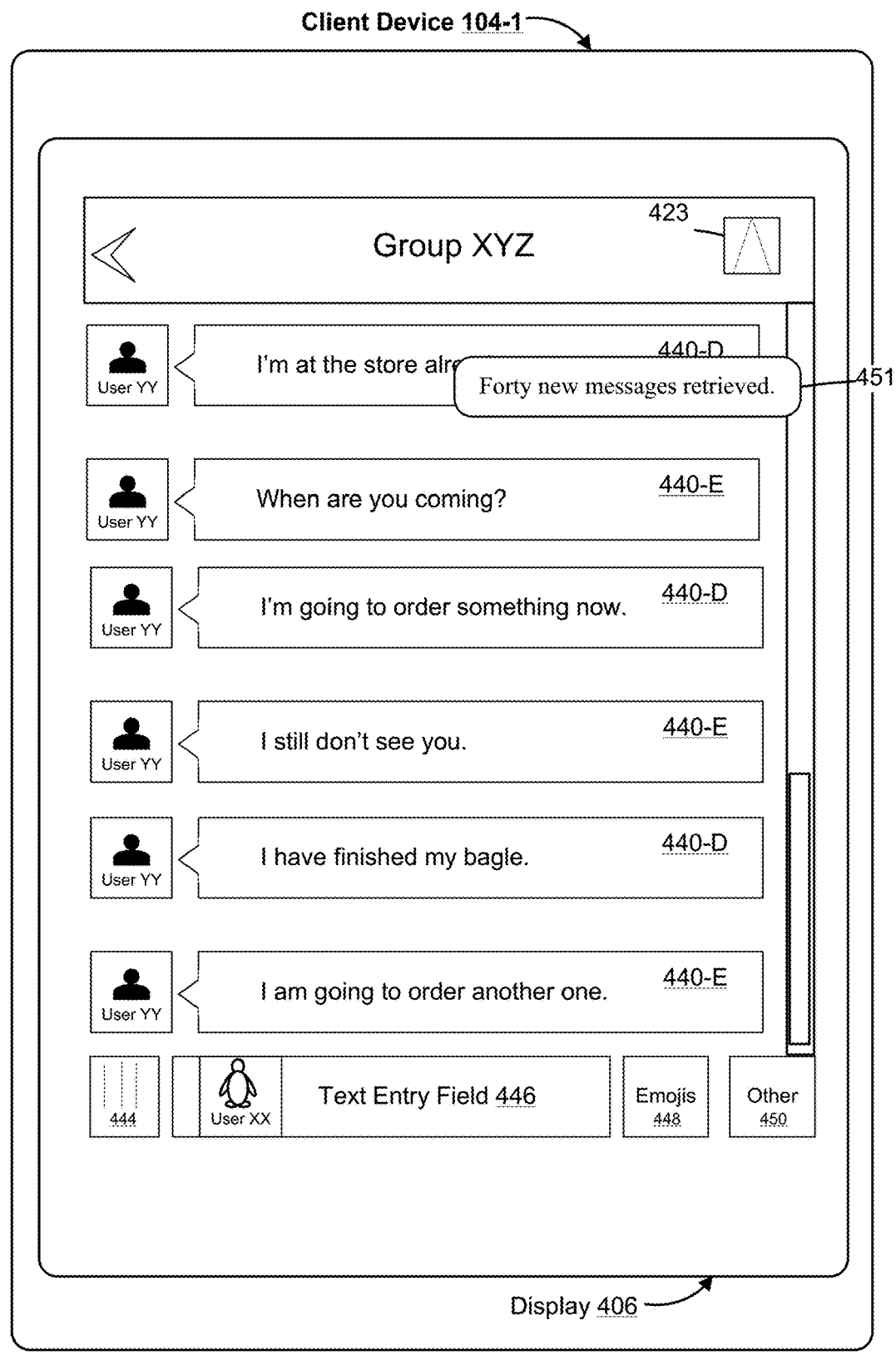

FIGS. 4H-4I illustrate that, without deactivating the message-on-hold mode, the user selects the icon for group conversation XYZ (e.g., by tapping on the icon 419 with a contact 450), in response to interaction with the icon 450, the conversation user interface 410 is redisplayed on client device 104-1. At the same time, the client device 104-1 determines that the criteria for exiting the communication suspension state of the message-on-hold mode and entering the communication resumption state of the message-on-hold mode is met, the client device 104-1 sends the update on the status of the message-on-hold mode to the server and retrieves all the messages that were withheld while the user account of user XX was in the communication suspension state for the first conversation group, as shown in FIG. 4I. In some embodiments, an indicator of the number of previously withheld messages are displayed. In some embodiments, the message download does not immediately start when the user interface 410 is displayed, and the messages are downloaded when the user selects the indicator 451. While the user continues to interact with the conversation interface 410 in FIG. 4I, as new messages are generated in the conversation group XYZ, the new messages are received and displayed in real-time as they are generated without delay, e.g., in the manner similar to when the message-on-hold mode was deactivated. In FIG. 4H, indicator 427 indicates messages and/or notification are still received for group conversation XYM, when the message-on-hold mode is active for the group conversation XYZ and in the communication suspension mode, but not activated for the group conversation XYM.

Figure 5:
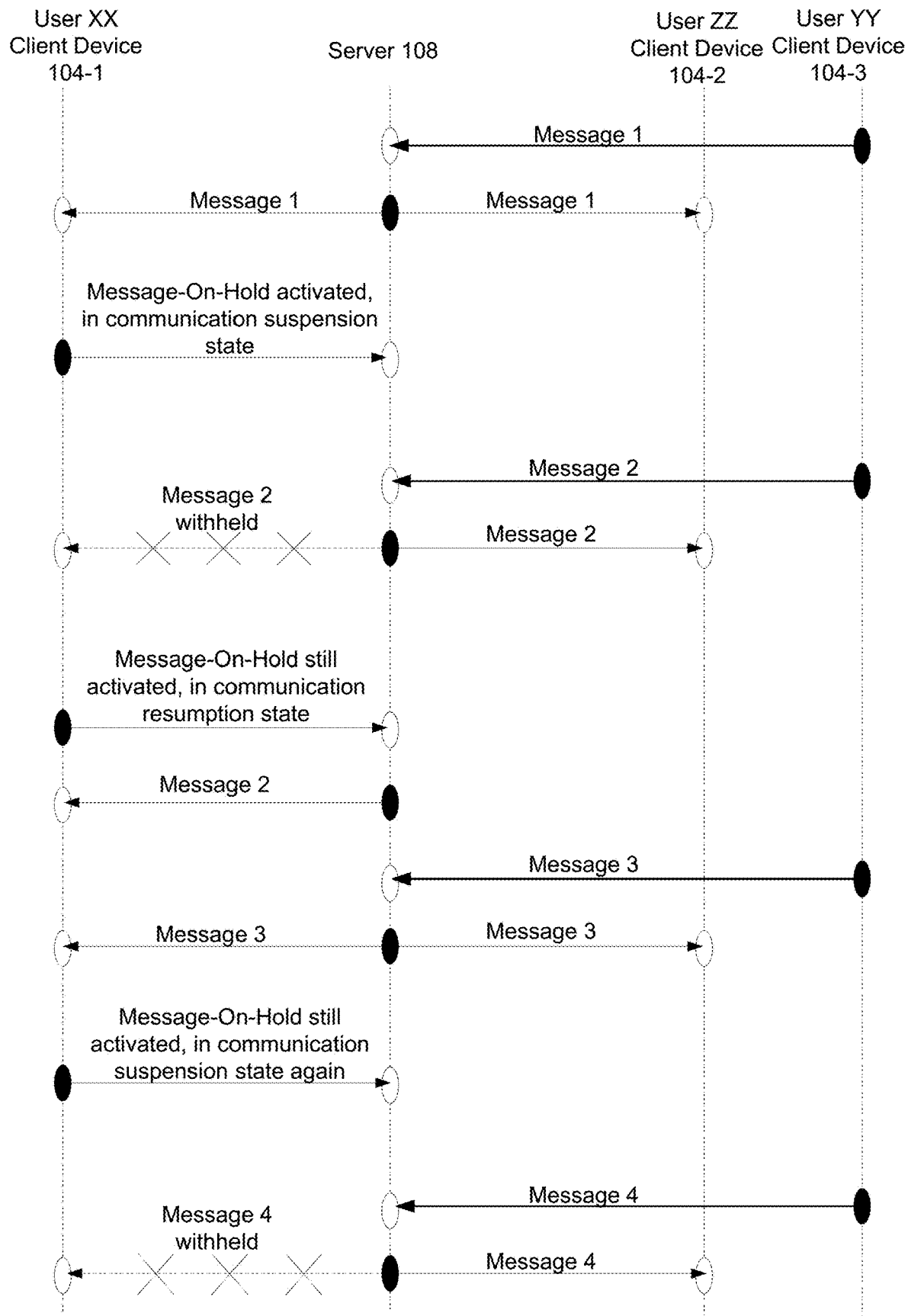
FIG. 5 is a communication diagram illustrating the operation of a message-on-hold mode for a first user account with respect to a first communication group, in accordance with some embodiments.
Figure 6A:
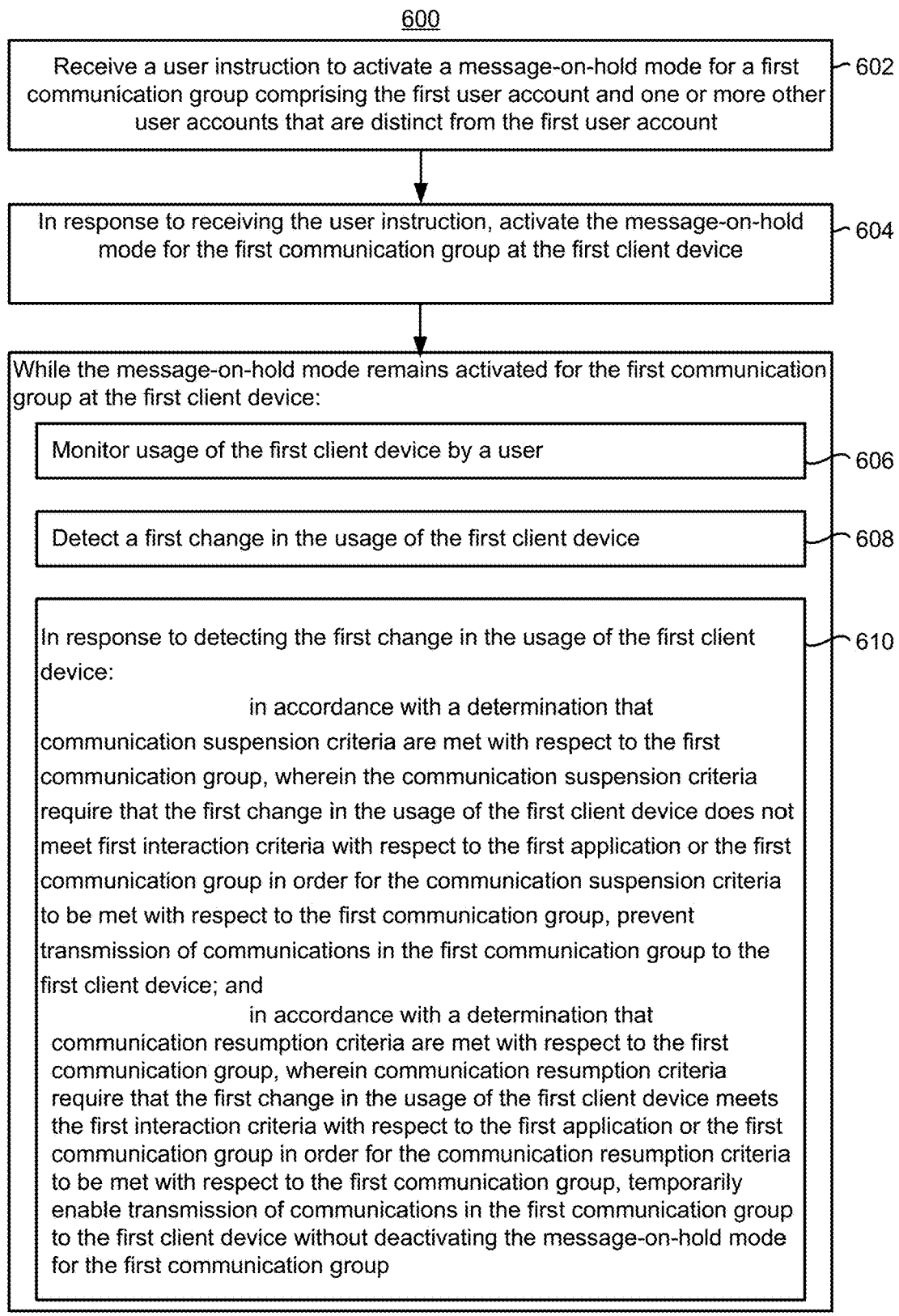

FIG. 5 illustrates a communication diagram of the communications between the server 108, the first client device 104-1, the second client device 104-2, and the third client device 104-3 during the interactions illustrated in FIGS. 4A-4I. As shown in FIG. 5, before the message-on-hold mode is activated for the group conversation XYZ, user YY sends Message 1 to the group, and the server receives Message 1 from user YY, and sends it to both user XX and user ZZ. After the message-on-hold mode is activated at the client device 104-1 for group conversation XYZ, the client device 104-1 sends an update to the server regarding the activation of the message-on-hold mode for group conversation XYZ. After the message-on-hold mode is activated for user XX with respect to group conversation XYZ, the communication suspension state is started by default. When the user YY sends Message 2 to the group, the server receives Message 2 and only forwards the message 2 to user ZZ, and withheld message 2 from user XX. When the user XX subsequently interacted with the client device 104-1 that indicates an interest to receive information and communicate in group conversation XYZ, the client device 104-1 sends a status update to the server to enter the communication resumption state. After the server updates the status of the message-on-hold mode for user XX for group conversation XYZ on the server side, when message 3 is received from user YY, the server forwards message 4 to both user XX and user ZZ, even though the message-on-hold is still activated for user XX. When the user XX interacts with the client device 104-1 in a manner that indicate that the user is no longer interacting with the first group conversation, the client-device determines that the criteria for reentering the communication suspension state are met, and notifies the server of the change in the state of the message-on-hold mode. Once the server receives the update, the server withholds the next message that is received in the conversation group (e.g., message 4 from user YY), and only forwards the message to user ZZ.

FIGS. 6A-6D illustrates a flowchart diagram of a method 600 of controlling message transmission for a communication group in accordance with some embodiments. In some embodiments, method 600 is performed by a client device, in conjunction with a server, or independently of a server. For example, in some embodiments, method 600 is performed by client device 104-1 (e.g., client-side module 102-1), in conjunction with server system 108 (FIGS. 1-2) or a component thereof (e.g., server-side module 106, FIGS. 1-2). In some embodiments, method 500 is governed by instructions that are stored in a non-transitory computer readable storage medium and the instructions are executed by one or more processors of the client and server systems. Optional operations are indicated by dashed lines (e.g., boxes with dashed-line borders).

In method 600 of providing a social network environment, at a first client device that is associated with a first user account of a social network platform (e.g., the first social networking platform has a corresponding social networking application (e.g., a first application) that is installed at the first client device, and the social networking application provides a user interface (e.g., conversation interface 410) that lists the conversations (e.g., including one-on-one conversations between the user of the first user account (e.g., user XX) and a user of a second user account (e.g., user ZZ), and group conversations between the user of the first user account (e.g., user XX) and two or more other participants or members (e.g., users of two or more other user accounts different from the first user account, e.g., users YY and ZZ), and public discussion or announcement rooms or bulletins that are followed by the first user account and multiple other user accounts, etc.) in which the user of the first user account is a participant): the first client device receives (602) a user instruction to activate a message-on-hold mode for a first communication group (e.g., a conversation group (e.g., conversation group XYZ), a public account followed by the first user account, or a one-on-one conversation) comprising the first user account and one or more other user accounts (e.g., including a second user account and/or a third account) that are distinct from the first user account; For example, the user instruction is received in the form of a user input that switches on a predefined toggle control corresponding to the message-on-hold mode in a settings user interface (e.g., as shown in FIG. 4D) of the first application for controlling the first communication group. In some embodiments, the message-on-hold mode is turned on and off independently for each communication group for which the first user account is a follower or participant. When the message-on-hold mode is turned off for a respective communication group, the server sends communications (e.g., messages and/or notifications) to the first client device as the communications are generated in the respective group conversation by other user accounts involved in the respective group conversation. When the message-on-hold mode is turned on for a respective communication group, the server refrains from sending communications (e.g., messages and notifications) to the first client device as the communications are generated in the respective group conversation by other user accounts involved in the respective group conversation, while continuing to push communications in the respective group conversation to other client devices participating in the respective group conversation. In some embodiments, when the message-on-hold mode is turned on for the respective group conversation, the server forgoes or refrains from pushing communications (e.g., messages and/or notifications) in the respective group conversation to the first client device in real-time as the communications are generated in the respective group conversation by other user accounts involved in the respective group conversation, while continuing with the real-time delivery/pushing of communications from other conversations to the first client device. In some embodiments, the user may separately control (e.g., a separate control for muting the group conversation's notifications) whether arrival of the communications or notifications are displayed or otherwise indicated to the user, by changing how notifications or communications appear to the user at the first client device (e.g., muted, as banners, show badges on application icons, whether on the lock screen or only in notification center, how much content from the communication should be included in the notification, etc.), however, those settings do not affect whether the communications and notifications are pushed in real-time to the first client device, and the user can open the application and see the messages and notifications that were received at the first client device from some time ago (e.g., when the messages and communications were sent in the first group conversation), even though there may be no other indication (e.g., badges, notifications, or banners, alerts, etc.) that the messages had arrived at the first client device. In some embodiments, the user may also separately blocking any communication from a certain user or group of users (e.g., using a separate blocking control to blacklist a group or user or severe the social network relationship with the group or user). The settings to block a group or a user prevent the user from receiving any communications from the group or user while the status of the group or user is blocked. In some embodiments, the other members will not see the first user account in the list of participants for the group conversation once the user of the first user account has blocked or left the conversation group. When a blocked user attempts to send a message to the first user account, the message will be returned to the sender and will not be delivered to the first user account.

In response to receiving the user instruction, the first client device activates (604) the message-on-hold mode for the first communication group at the first client device (e.g., while keeping the message-on-hold mode deactivated for a second communication group (e.g., a second conversation group XYM, a second public account followed by the first user account, or a second one-on-one conversation)).

While the message-on-hold mode remains activated for the first communication group at the first client device (and while the message-on-hold mode remains deactivated for the second communication group at the first client device): the first client device monitors (606) usage of the first client device by a user (e.g., monitoring the user selecting windows of the first application or of other applications, transitioning to new user interfaces within the first application or outside of the first application, selecting a control or user interface object within the user interfaces of the first application or outside of the first application, etc.).

While the message-on-hold mode remains activated for the first communication group at the first client device, the first client device detects (608) a first change in the usage of the first client device.

While the message-on-hold mode remains activated for the first communication group at the first client device: in response to detecting the first change in the usage of the first client device: in accordance with a determination that the first change in the usage of the first client device does not match first interaction criteria with respect to the first application or the first communication group, the first client device prevents (610) transmission of communications in the first communication group to the first client device (e.g., preventing transmission by maintaining a message-on-hold status flag at a server that is responsible for transmitting communications in the first communication group to the participant devices of the first communication group, such that the server forgoes transmission of the communications to the first client device even though the first client device continues to remain as a participant or member of the communication group). In some embodiments, in accordance with a determination that the communication suspension criteria are no longer met, the client device sends an update to the server to change the state of the message-on-hold mode from the communication suspension state to the communication resumption mode. In some embodiments, the communication suspension criteria further require that the message-on-hold mode is activated (and not deactivated by the user) when the first interaction criteria are not met by the user's usage of the first client device.

In response to detecting the first change in the usage of the first client device: in accordance with a determination that the first change in the usage of the first client device matches the first interaction criteria with respect to the first application or the first communication group, the first client device temporarily enables (610) transmission of communications in the first communication group to the first client device without deactivating the message-on-hold mode for the first communication group (e.g., when the first change does not include a change in the toggle state of the message-on-hold mode for the first communication group and the interaction is with the first communication group, the communication resumption criteria are met); In some embodiments, the first client device enables the transmission of the communications by resetting the message-on-hold status flag at the server from the communication suspension state to the communication resumption state, such that the server does not forgo transmission of the communications to the first client device even though the message-on-hold mode still remains activated for the communication group at the first client device. In some embodiments, in accordance with a determination that the communication resumption criteria are not met, the client device does not send an update to the server to change the state of the message-on-hold mode from the communication suspension state to the communication resumption mode. In some embodiments, the communication resumption criteria further require that the message-on-hold is activated (and not deactivated by the user) when the first interaction criteria are not met by the user's usage of the first client device.

In some embodiments, monitoring the usage of the first client device by the user includes (612) monitoring an input focus state of a first user interface object (e.g., a conversation window, a conversation list item (e.g., icon 419)) that corresponds to the first communication group at the first client device (and that does not corresponds to the second communication group). In some embodiments, monitoring the usage of the first client device by the user includes monitoring inputs of a predefined type has been detected with respect to the first user interface object that corresponds to the first communication group at the first client device. For example, if the user merely browsed through a list of conversation groups, and the first conversation group is scrolled past the display as the user is browsing through the list of conversation groups, the first client device does not consider the interaction with the first conversation group to be of the type that will match the first interaction criteria. If, however, the user has actually tapped on icon or window of the first communication group, such that the icon or window of the first communication group gains input focus as a result of the tap input, the first client device determines that an input of the predefined input type has been detected, and that the first interaction criteria are met with respect to the first communication group. In some embodiments, the first client device requires that the interaction with the first user interface object that corresponds to the first communication group to be sustained for at least a threshold amount of time in order to determine that the first interaction criteria have been met with respect to the first communication group.

In some embodiments, monitoring the usage of the first client device by the user includes (614) monitoring whether a level of user interaction with a first user interface object (e.g., a conversation window, a conversation list item (e.g., icon 419)) that corresponds to the first communication group at the first client device exceeds a level of user interaction with respective user interface objects that correspond to other communication groups that involve the first user account. For example, if the user is browsing through a list of conversations in a conversation listing user interface of the first application, and paused over the list icon for the first group conversation more than the list icons for the other group conversations by a threshold amount of time, the device optionally determines that the level of user interaction with respect to the first communication group exceeds the level of user interaction with respect to the other communication groups of which the user is a participant, and as a result determines that the first interaction criteria are met with respect to the first communication group. In another example, if the user is dragging multiple conversation windows around on the desktop, but expands the conversation window for the first communication group after dragging and rearranging the multiple conversation windows, the device optionally determines that the level of user interaction with respect to the first communication group exceeds the level of user interaction with respect to the other communication groups of which the user is a participant, and as a result determines that the first interaction criteria are met with respect to the first communication group. In some embodiments, the interactions that are evaluated are activities that are indicative of the user's interest in receiving communication and information from the first conversation group, e.g., as opposed to configuring the settings for the first communication group, or adjusting visual appearance of the conversation window, cleaning up the desktop, reorganizing the conversation list, etc.

In some embodiments, the first interaction criteria require (616) that the first change in the usage of the first client device includes a change in a state of a first user interface object indicates that a first user interface object that corresponds to the first communication group has gained input focus in order for the first interaction criteria to be met. For example, the first user interface object may be a conversation window that displays the communication history of the first communication group, and the conversation window gains input focus when the user clicks on the conversation window or expands a minimized version of the conversation window, bringing the conversation window from the background to the foreground of the display. In another example, the first user interface object may be a list icon that represents the first communication group in a listing of communication groups or conversations of which the user of the first user account is a participant, and the list icon gains input focus when the user hovers a finger over the list icon for more than a threshold amount of time, or when the user taps on the list icon to open the conversation history of the first communication group, etc.

In some embodiments, temporarily enabling transmission of communications in the first communication group to the first client device without deactivating the message-on-hold mode for the first communication group includes (618): sending a first status update to a server indicating to the server that the first interaction criteria are met with respect to the first communication group, wherein the server stores the first status update and temporarily enables transmission of communications in the first communication group to the first client device without deactivating the message-on-hold mode for the first communication group. In some embodiments, the server sets a flag corresponding to the message-on-hold mode to a communication resumption state, and transmits previous messages in the first communication group that have been withheld from the first client device to the first client device, and transmits any subsequent communications in the first communication group to the first client device as the communications are generated in the first communication group (e.g., by the members of the first communication group).

In some embodiments, preventing transmission of communications in the first communication group to the first client device includes (620) sending a second status update to a server indicating to the server that the first interaction criteria are no longer met with respect to the first communication group, wherein the server stores the second status update and suspends transmission of communications in the first communication group to the first client device without deactivating the message-on-hold mode for the first communication group. In some embodiments, the server sets a flag corresponding to the message-on-hold mode to a communication suspension state, and withholds transmission of any subsequent communications in the first communication group to the first client device as the communications are generated in the first communication group (e.g., by the members of the first communication group).

In some embodiments, activating the message-on-hold mode for the first communication group includes (622): notifying a server that the message-on-hold mode is activated with respect to the first communication group for the first user account, wherein, in response to being notified that the message-on-hold mode is activated for the first communication group for the first user account, the server changes a toggle state of the message-on-hold mode from a first state (an OFF state) to a second state (e.g., an ON state), and sets the status flag for the message-on-hold mode to a communication suspension state, wherein the server forgoes transmitting, to the first client device, communications that are sent within the first communication group by the one or more other user accounts. In some embodiments, if the message-on-hold mode is not activated for a second communication group at this time, the server continues to push and the first client device continues to receive communications (e.g., messages and/or notifications) that are sent within the second communication group in substantially real-time, even if the first communication group and the second communication group have overlapping members, and the communications are sent by the same users in the first and second communication groups.

In some embodiments, while the message-on-hold mode remains activated for the first communication group at the first client device (and while the message-on-hold mode remains deactivated for the second communication group at the first client device) and while transmission of communications is temporarily enabled without deactivating the message-on-hold mode for the first communication group (e.g., subsequent changes in the usage of the first client device do not match the communication suspension criteria for terminating the temporary suspension of the message-on-hold mode for the first group conversation), the first client device receives (624), from the server, at least one communication in the first communication group (e.g., including at least a first communication that had been sent at a time before the change was detected at the first client device and at least a second communication that is sent at a time after the change was detected (e.g., and displaying both communications or indicators of the communications in the conversation window that corresponds to the first communication group).

In some embodiments, while the message-on-hold mode remains activated for the first communication group at the first client device, the first client device maintains (626) display of a conversation list item that corresponds to the first communication group in a conversation listing of the social networking platform. For example, the application that corresponds to the social networking platform can remain the active application on the first client device, and the window or user interface of the application can remain the active window or user interface of the first client device, while the message-on-hold mode is active for the first communication group (e.g., as shown in FIG. 4E). The level of interaction required is more targeted than the application-level, and it more communication group level interactions. For example, when the message-on-hold mode is activated for a first group conversation and is not activated for a second group conversation, when the conversation listing is displayed in the first application, the list item that corresponds to the first group conversation is displayed with the list item that corresponds to the second group conversation, but the device does not receive any new messages or notifications for the first group conversation, even if there are ongoing message communications going on within the first group conversation among other participants of the first group conversation, or from other members of the first group conversation to the first user account, unless the user interaction changes an input focus state of a user interface object that corresponds to the first group conversation, e.g., when the user selects (e.g., taps or clicks on) the list item that corresponds to the first group conversation. This prevents the application from downloading all communications for all communication groups at the same time when the user first brought the application to the foreground, and temporarily slows down the response of the device, and distracts to the user from the conversation group that he/she is really interested in.

In some embodiments, while the message-on-hold mode remains activated for the first communication group, the first user account remains (628) within the first communication group and the server continues to transmit communications to one or more other members of the first communication group that have not activated the message-on-hold mode with respect to the first communication group. For example, in some embodiments, when the first user account is in the message-on-hold mode with respect to the first group conversation, when another user account sends a message to the whole group, the server sends the message to each of the user accounts in the first conversation group, except to those user accounts that have activated the message-on-hold mode with respect to the first conversation group. In some embodiments, the server sends an indication to the other user accounts that do not have the message-on-hold mode activated for the first conversation group that the first user account is currently in the message-on-hold mode, and is not able to receive any messages at the present time. For example, a green pause button may be displayed next to the avatar of the first user account in the conversation user interface of the first group conversation at the client devices associated with the other user accounts that are involved in the first group conversation. In some embodiments, the server does not provide any indication to other user accounts that the first user account is currently in the message-on-hold mode, so the other users in the group conversation cannot tell if their messages have been delivered to the first user account. The message-on-hold mode allows the user to remain in the first conversation group, and does not block or cancel the whole conversation group. In addition, while the message-on-hold may be activated with respect to the first conversation group, the first client device will continue to receive communications that are send from members of the first conversation group in other conversation groups that the first user account is also participating in. In other words, the message-on-hold mode applies to the communication group for which it is activated, and not the user accounts that are members of the communication group. In some embodiments, the message-on-hold mode is not based on the identity and relationship of the conversation partners, and the user can remain in the conversation group (not remove himself from the conversation group and can regain access to older messages sent during the message suspension state of the message-on-hold mode later), or carry out a private message session with one or more other members of the conversation group separately over the social network while the message-on-hold mode is on for the group conversation (e.g., the other members are not blocked by the user for the purposes of communicating with the user over the social network platform). When the message-on-hold mode is on for a conversation group, the device automatically activates and deactivates message transmission based on scenarios (e.g., based on whether interaction level for message transmission (or message blocking) for the conversation group is met). When the message-on-hold mode is off for a conversation group, the device always allows message transmission for the communications occurring in the conversation group without undue delay. When the message-block mode is on for a conversation group, the user account is removed from the conversation group, and the device always block message transmission from that conversation group.

In some embodiments, while the message-on-hold mode remains activated for the first communication group at the first client device, and a locally stored status indicator for the message-on-hold mode indicates that communication from the first communication group is currently suspended (e.g., the communication resumption criteria are not met), the first client device receives (630), at the first client device, one or more communications in the first communication group, from the server (e.g., the status update has been out of synch with the status update locally stored at the first client device with respect to whether the message-on-hold mode (still activated) should be given a message suspensions state or the message resumption state); and in response to receiving the one or more communications while the locally stored status indicator for the message-on-hold mode indicates that the communication from the first communication group is currently suspended, the first client device sends a status correction request to the server to inform the server that communication from the first communication group is currently in a communication suspension state. In some embodiments, the server updates its status flag to indicate that communication in the first communication group should be withheld from the first client device until additional update is received to change the state from communication suspension state to the communication resumption state.

It should be understood that the particular order in which the operations in FIGS. 6A-6D have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods and/or processes described herein are also applicable in an analogous manner to method 600 described above.

While particular embodiments are described above, it will be understood it is not intended to limit the application to these particular embodiments. On the contrary, the application includes alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the embodiments.

What is claimed is:

1. A method of providing a social network environment, comprising:
    at a first client device that is associated with a first user account of a social network platform:
        displaying, on a group chat listing interface, a first conversation list item corresponding to a first communication group and a second conversation list item corresponding to a second communication group distinct from the first communication group, wherein neither the first communication group nor the second communication group is activated with a message-on-hold mode that is configured to disable the first user account from receiving messages from other user accounts of the same communication group;
        receiving a user instruction to activate the message-on-hold mode for the first communication group comprising the first user account and one or more other user accounts that are distinct from the first user account;
        in response to receiving the user instruction, activating the message-on-hold mode to disable the first user account from receiving messages from the one or more other user accounts of the first communication group at the first client device;
        detecting a first user action on the group chat listing interface of the first client device;
        in accordance with a determination that the first user action selects the first conversation list item corresponding to the first communication group:
            preventing transmission of communications in the first communication group to the first client device according to the message-on-hold mode;
            displaying, on a first group chat interface, one or more previously reviewed messages with an overlay message indicator indicating that a first plurality of messages has been withheld from being delivered to the first client device and displaying on the first group chat interface; and while the message-on-hold mode is active, in response to a second user action on the overlay message indicator, displaying the first plurality of messages on the first group chat interface of the first communication group and removing the overlay message indicator from the first group chat interface; and in accordance with a determination that the first user action selects the second conversation list item corresponding to the second communication group:

determining that the message-on-hold mode is not activated for the second communication group; and displaying, in real time, a second plurality of messages from other user accounts on a second group chat interface of the second communication group.

2. The method of claim 1, further comprising:

monitoring usage of the first client device by a user, further including monitoring an input focus state of the first conversation list item that corresponds to the first communication group at the first client device; and controlling the message-on-hold mode of the first communication group based on the usage of the first client device by the user.

3. The method of claim 1, further comprising:

monitoring, on the group chat listing interface, whether a level of user interaction with the conversation list item that corresponds to the first communication group at the first client device exceeds a level of user interaction with respective conversation list items that correspond to other communication groups that involve the first user account; and automatically controlling the message-on-hold mode of the first communication group based on the level of user interaction with the first conversation list item.

4. The method of claim 1, further comprising:

determining a duration of time for which the first user action lasts, wherein the first user action is a finger hovering over the first conversation list item that corresponds to the first communication group on the group chat listing interface; and in accordance with a determination that that the duration of time is greater than a threshold amount of time to make the first conversation list item gain input focus, temporarily enabling transmission of communications in the first communication group to the first client device without deactivating the message-on-hold mode for the first communication group.

5. The method of claim 4, wherein temporarily enabling transmission of communications in the first communication group to the first client device without deactivating the message-on-hold mode for the first communication group includes:

sending a first status update to a server indicating to the server that first interaction criteria are met with respect to the first communication group, wherein the server stores the first status update and temporarily enables transmission of communications in the first communication group to the first client device without deactivating the message-on-hold mode for the first communication group.

6. The method of claim 5, wherein preventing transmission of communications in the first communication group to the first client device includes sending a second status update to a server indicating to the server that the first interaction criteria are no longer met with respect to the first communication group, wherein the server stores the second status update and suspends transmission of communications in the first communication group to the first client device without deactivating the message-on-hold mode for the first communication group.

7. The method of claim 1, wherein activating the message-on-hold mode for the first communication group includes:

notifying a server that the message-on-hold mode is activated with respect to the first communication group for the first user account, wherein, in response to being notified that the message-on-hold mode is activated for the first communication group for the first user account, the server changes a toggle state of the message-on-hold mode from a first state to a second state, and sets a status flag for the message-on-hold mode to a communication suspension state, wherein the server forgoes transmitting, to the first client device, communications that are sent within the first communication group by the one or more other user accounts.

8. The method of claim 4, including:

while the message-on-hold mode remains activated for the first communication group at the first client device and while transmission of communications is temporarily enabled without deactivating the message-on-hold mode for the first communication group, receiving, from a server, at least one communication in the first communication group.

9. The method of claim 1, further comprising:

while the message-on-hold mode remains activated for the first communication group at the first client device, continuing to display the first conversation list item that corresponds to the first communication group on the group chat listing interface of the social networking platform.

10. The method of claim 1, wherein:

while the message-on-hold mode remains activated for the first communication group, a server continues to transmit communications to the one or more other user accounts of the first communication group that have not activated the message-on-hold mode with respect to the first communication group.

11. The method of claim 1, including:

while the message-on-hold mode remains activated for the first communication group at the first client device, and a locally stored status indicator for the message-on-hold mode indicates that communication from the first communication group is currently suspended, receiving, at the first client device, one or more communications in the first communication group, from a server; and in response to receiving the one or more communications while the locally stored status indicator for the message-on-hold mode indicates that the communication from the first communication group is currently suspended, sending a status correction request to the server to inform the server that communication from the first communication group is currently in a communication suspension state.

12. An electronic device, wherein the electronic device includes a first client device associated with a first user account of a social network platform, comprising:

a display;

a touch-sensitive surface;

one or more processors;

memory; and one or more programs, wherein the one or more programs are stored in the memory and configured to be executed by the one or more processors, the one or more programs including instructions for:
displaying, on a group chat listing interface, a first conversation list item corresponding to a first communication group and a second conversation list item corresponding to a second communication group distinct from the first communication group, wherein neither the first communication group nor the second communication group is activated with a message-on-hold mode that is configured to disable the first user account from receiving messages from other user accounts of the same communication group;
receiving a user instruction to activate the message-on-hold mode for the first communication group comprising the first user account and one or more other user accounts that are distinct from the first user account;
in response to receiving the user instruction, activating the message-on-hold mode to disable the first user account from receiving messages from the one or more other user accounts of the first communication group at the first client device;
detecting a first user action on the group chat listing interface of the first client device;
in accordance with a determination that the first user action selects the first conversation list item corresponding to the first communication group:
preventing transmission of communications in the first communication group to the first client device according to the message-on-hold mode;
displaying, on a first group chat interface, one or more previously reviewed messages with an overlay message indicator indicating that a first plurality of messages has been withheld from being delivered to the first client device and displaying on the first group chat interface; and
while the message-on-hold mode is active, in response to a second user action on the overlay message indicator, displaying the first plurality of messages on the first group chat interface of the first communication group and removing the overlay message indicator from the first group chat interface; and
in accordance with a determination that the first user action selects the second conversation list item corresponding to the second communication group:
determining that the message-on-hold mode is not activated for the second communication group; and
displaying, in real time, a second plurality of messages from other user accounts on a second group chat interface of the second communication group.

13. The electronic device of claim 12, the one or more programs further comprising instructions for:
monitoring usage of the first client device by a user, further including monitoring an input focus state of the first conversation list item that corresponds to the first communication group at the first client device; and
controlling the message-on-hold mode of the first communication group based on the usage of the first client device by the user.

14. The electronic device of claim 12, the one or more programs further comprising instructions for:
monitoring, on the group chat listing interface, whether a level of user interaction with the conversation list item that corresponds to the first communication group at the first client device exceeds a level of user interaction with respective conversation list items that correspond to other communication groups that involve the first user account; and
automatically controlling the message-on-hold mode of the first communication group based on the level of user interaction with the first conversation list item.

15. The electronic device of claim 12, the one or more programs further comprising instructions for:
determining a duration of time for which the first user action lasts, wherein the first user action is a finger hovering over the first conversation list item that corresponds to the first communication group on the group chat listing interface; and
in accordance with a determination that that the duration of time is greater than a threshold amount of time to make the first conversation list item gain input focus, temporarily enabling transmission of communications in the first communication group to the first client device without deactivating the message-on-hold mode for the first communication group.

16. The electronic device of claim 12, wherein activating the message-on-hold mode for the first communication group includes:
notifying a server that the message-on-hold mode is activated with respect to the first communication group for the first user account, wherein, in response to being notified that the message-on-hold mode is activated for the first communication group for the first user account, the server changes a toggle state of the message-on-hold mode from a first state to a second state, and sets a status flag for the message-on-hold mode to a communication suspension state, wherein the server forgoes transmitting, to the first client device, communications that are sent within the first communication group by the one or more other user accounts.

17. The electronic device of claim 15, wherein the one or more programs further comprise instructions for:
while the message-on-hold mode remains activated for the first communication group at the first client device and while transmission of communications is temporarily enabled without deactivating the message-on-hold mode for the first communication group, receiving, from a server, at least one communication in the first communication group.

18. The electronic device of claim 12, wherein the one or more programs further comprise instructions for:
while the message-on-hold mode remains activated for the first communication group at the first client device, continuing to display the first conversation list item that corresponds to the first communication group on the group chat listing interface of the social networking platform.

19. A non-transitory computer readable storage medium storing one or more programs, the one or more programs comprising instructions, which when executed by a first client device that includes a display and a touch-sensitive surface and is associated with a first user account of a social network platform, cause the first client device to:
display, on a group chat listing interface, a first conversation list item corresponding to a first communication group and a second conversation list item corresponding to a second communication group distinct from the first communication group, wherein neither the first communication group nor the second communication group is activated with a message-on-hold mode that is configured to disable the first user account from receiving messages from other user accounts of the same communication group;

receive a user instruction to activate the message-on-hold mode for the first communication group comprising the first user account and one or more other user accounts that are distinct from the first user account;

in response to receiving the user instruction, activate the message-on-hold mode to disable the first user account from receiving messages from the one or more other user accounts of the first communication group at the first client device;

detect a first user action on the group chat listing interface of the first client device;

in accordance with a determination that the first user action selects the first conversation list item corresponding to the first communication group:
  prevent transmission of communications in the first communication group to the first client device according to the message-on-hold mode;
  display, on a first group chat interface, one or more previously reviewed messages with an overlay message indicator indicating that a first plurality of messages has been withheld from being delivered to the first client device and displaying on the first group chat interface; and
  while the message-on-hold mode is active, in response to a second user action on the overlay message indicator, display the first plurality of messages on the first group chat interface of the first communication group and removing the overlay message indicator from the first group chat interface; and in accordance with a determination that the first user action selects the second conversation list item corresponding to the second communication group:
  determine that the message-on-hold mode is not activated for the second communication group; and
  display, in real time, a second plurality of messages from other user accounts on a second group chat interface of the second communication group.

20. The non-transitory computer readable storage medium of claim 19, the one or more programs further comprising instructions for:

monitoring, on the group chat listing interface, whether a level of user interaction with the conversation list item that corresponds to the first communication group at the first client device exceeds a level of user interaction with respective conversation list items that correspond to other communication groups that involve the first user account; and automatically controlling the message-on-hold mode of the first communication group based on the level of user interaction with the first conversation list item.

* * * * *